(12) United States Patent  
Nakamura

(10) Patent No.: US 7,540,572 B2  
(45) Date of Patent: Jun. 2, 2009

(54) FAILURE DETECTING APPARATUS

(75) Inventor: Eiji Nakamura, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 416 days.

(21) Appl. No.: 11/266,376

(22) Filed: Nov. 4, 2005

(65) Prior Publication Data

US 2006/0113836 A1   Jun. 1, 2006

(30) Foreign Application Priority Data

Nov. 30, 2004   (JP)   ............... 2004-346129

(51) Int. Cl.
B60T 8/88   (2006.01)
(52) U.S. Cl. ................... 303/122.05; 303/122.09; 303/119.2
(58) Field of Classification Search ........... 303/122, 303/122.04, 122.09, 119.2, 122.05, 122.06, 303/122.08, 122.1; 137/15.11, 557
See application file for complete search history.

(56) References Cited

U.S. PATENT DOCUMENTS

| 4,824,182 | A | | 4/1989 | Steffes et al. |
| 5,997,106 | A | | 12/1999 | Takayama |
| 6,007,163 | A | * | 12/1999 | Sawada ............... 303/122.09 |
| 6,065,734 | A | * | 5/2000 | Tackett et al. ............ 303/119.2 |
| 6,595,599 | B2 | * | 7/2003 | Soga ..................... 303/122.04 |
| 6,896,338 | B2 | * | 5/2005 | Nakayasu et al. ...... 303/122.09 |

FOREIGN PATENT DOCUMENTS

| DE | 36 30 342 C2 | 3/1988 |
| DE | 197 45 377 C2 | 4/1998 |
| JP | B2 2546851 | 8/1996 |
| JP | A 2003-205838 | 7/2003 |

* cited by examiner

Primary Examiner—Thomas J Williams
(74) Attorney, Agent, or Firm—Oliff & Berridge, PLC

(57) ABSTRACT

A failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil, so that the solenoid-operated control valve is selectively placed in one of an open state thereof and a closed state thereof, the failure detecting apparatus including a pressure-change detecting device which detects a change of a pressure on at least one of a high-pressure side and a low-pressure side of the solenoid-operated control valve; and a failure detecting portion which detects that the solenoid-operated control valve has failed, when a change of the pressure detected by the pressure-change detecting device upon controlling of the electric current supplied to the coil is smaller than a change of the pressure that results from a change of the volume of the valve chamber caused by a movement of the movable member.

20 Claims, 10 Drawing Sheets

FAILURE DETECTING APPARATUS

The present application is based on Japanese Patent Application No. 2004-346129 filed Nov. 30, 2004, the contents of which are incorporated herein by reference.

BACKGROUND OF THE INVENTION

1. Field of the Invention

The present invention relates to a failure detecting apparatus that detects a failure of a solenoid-operated control valve for use in a vehicle's brake system.

2. Discussion of Related Art

Patent Document 1 (Japanese Patent Application Publication No. 2003-205838) discloses a vehicle's hydraulic brake device including a solenoid-operated control valve, and Patent Document 2 (Japanese Patent No. 2,546,851) discloses a vehicle's hydraulic brake device including a hydraulic chamber, a high-pressure source, a low-pressure source, a first solenoid-operated control valve provided between the hydraulic chamber and the high-pressure source, a second solenoid-operated control valve provided between the hydraulic chamber and the low-pressure source, a pressure switch that can take different states corresponding to a first state in which a hydraulic pressure in the hydraulic chamber is not higher than a reference pressure and a second state in which the pressure in the hydraulic chamber is higher than the reference pressure, and a failure detecting device that detects respective failures of the first and second solenoid-operated control valves based on a change of the state of the pressure switch upon opening or closing of the first solenoid-operated control valve and a change of the state of the pressure switch upon opening or closing of the second solenoid-operated control valve. In the brake device disclosed by Patent Document 2, when the second solenoid-operated control valve is switched from the closed state thereof to the open state thereof, the pressure in the hydraulic chamber should decrease to a value not higher than the reference value; and subsequently, when the second solenoid-operated control valve is switched to the closed state thereof and the first solenoid-operated control valve is switched from the closed state thereof to the open state thereof, then the pressure in the hydraulic chamber should increase to a value higher than the reference value. Therefore, if the state of the pressure switch does not change upon controlling of an electric current supplied to a coil of each of the first and second solenoid-operated control valves, it can be judged that the each solenoid-operated control valve has failed.

SUMMARY OF THE INVENTION

It is therefore an object of the present invention to provide a technique of detecting a failure of a solenoid-operated control valve based on a change of pressure resulting from a change of a volume of a valve chamber caused by a movement of a movable member in the control valve.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the claimed inventions. Each of the following modes (1) through (22) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith and but also the detailed description of the preferred embodiments of the invention, and that in additional claimable modes, one or more elements or one or more technical features may be added to, or deleted from, any of the following specific modes.

(1) A failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil, so that the solenoid-operated control valve is selectively placed in one of an open state thereof and a closed state thereof, the failure detecting apparatus comprising:

a pressure-change detecting device which detects a change of a pressure on at least one of a high-pressure side and a low-pressure side of the solenoid-operated control valve; and a failure detecting portion which detects that the solenoid-operated control valve has failed, when a change of the pressure detected by the pressure-change detecting device upon controlling of the electric current supplied to the coil is smaller than a change of the pressure that results from a change of the volume of the valve chamber caused by a movement of the movable member.

A solenoid-operated control valve is constructed such that a movable member thereof is moved by an electromagnetic drive force produced upon supplying of an electric current to a coil thereof, and the movement of the movable member selectively opens or closes the control valve. When a volume of a valve chamber of the control valve is changed by the movement of the movable member, a pressure on at least one of a high-pressure side and a low-pressure side of the control valve is changed.

However, if the solenoid-operated control valve has mechanically failed, that is, the movable member cannot be moved in spite of supplying of the electric current to the coil, the volume of the valve chamber cannot be not changed and accordingly no pressure change occurs.

This phenomenon can be utilized to detect the failure of the solenoid-operated control valve, i.e., the mechanical failure that the movable member cannot be moved.

So long as the solenoid-operated control valve can normal operate, the above-indicated pressure change can occur not only when a difference of a high pressure on the high-pressure side of the control valve and a low pressure on the low-pressure side of the solenoid-operated control valve is negligible, but also when the high and low pressures on the high-pressure side and the low-pressure side are each equal to a standard pressure. In other words, the failure of the solenoid-operated control valve can be detected not only when the difference of the high pressure on the high-pressure side and the low pressure on the low-pressure side is negligible, but also when the high and low pressures on the high-pressure side and the low-pressure side are each equal to the standard pressure. The standard pressure is defined as a pressure when an operating device including the solenoid-operated control valve is in a static state. For example, in the case where the operating device is a hydraulic brake device of a vehicle, the standard pressure may be an atmospheric pressure; and in the case where the operating device is a suspension device of a vehicle, the standard pressure may be a pressure when the vehicle takes a standard posture.

The pressure-change detecting device detects a change of the pressure on at least one of the high-pressure side and the low-pressure side of the solenoid-operated control valve. The pressure-change detecting device may be provided on one of the high-pressure side and the low-pressure side, or on each of the high-pressure side and the low-pressure side. In addition, the detecting device may be one including a pressure sensor that detects the pressure on at least one of the high-pressure side and the low-pressure side, or one including a pressure switch that is selectively switchable to an ON state thereof corresponding to a first state in which the pressure on at least one of the high-pressure side and the low-pressure side is higher than a reference pressure, and an OFF state thereof corresponding to a second state in which the pressure is not higher than the reference pressure. In the case where the pressure sensor is employed, a change of the pressure, such as an amount of change of the pressure or a rate of change of the pressure, is detected; and in the case where the pressure switch is employed, a change of the pressure between the first and second states is detected. The pressure-change detecting device may be one that is employed exclusively for the purpose of detecting the failure, or one that is employed mainly for the purpose of playing a different role in, e.g., a hydraulic brake device and additionally for the purpose of detecting the failure.

In the present failure detecting apparatus, the failure detecting portion detects or judges that the solenoid-operated control valve has failed, when an actual change of the pressure detected by the pressure-change detecting device upon controlling of the electric current supplied to the coil of the control valve is smaller than the change of the pressure that results from the change of the volume of the valve chamber caused by the movement of the movable member when the control valve is normal.

That the actual change of the pressure is smaller than the normal change of the pressure when the solenoid-operated control valve is normal has a meaning that the actual pressure change is significantly or apparently smaller than the normal pressure change. The normal pressure change may be obtained theoretically or experimentally. However, the pressure changes may contain natural dispersions and/or measurement errors. Hence, if the actual pressure change detected by the pressure-change detecting device can be said as being smaller than the normal pressure change while the natural dispersions and/or the measurement errors are taken into account, then it is judged that the solenoid-operated control valve as an object valve has failed.

For example, when the actual pressure change is smaller than a failure-judgment pressure change, it can be judged that the solenoid-operated control valve has failed. The failure-judgment pressure change may be determined based on the normal pressure change, and data representing the failure-judgment pressure change may be stored in a memory. It is preferred that the failure-judgment pressure change be smaller than the normal pressure change.

More specifically described, in the case where an average value of the pressure during a certain time duration before the controlling of the electric current supplied to the coil of the solenoid-operated control valve and an average value of the pressure during a certain time duration after the controlling differ from each other, if an amount of change of the average sight pressure actually detected by the pressure-change detecting device (hereinafter, referred to as the "average-pressure change amount") is smaller than a failure-judgment change amount (i.e., a failure-judgment threshold value), then it is judged that the control valve has failed. The average-pressure change amount may be represented by a value obtained by subtracting, from the first average value of the pressure during the time duration before the controlling of the electric current, the second average value of the pressure during the time duration after the controlling; or an absolute value of the difference of the first and second average values. It is preferred that the failure-judgment change amount be smaller than a normal average-pressure change amount. For example, the failure-judgment change amount may be an amount obtained by multiplying the normal average-pressure change amount by a value smaller than one, or an amount obtained by subtracting a value from the normal average-pressure change amount. As described above, it is preferred that the failure-judgment change amount be determined while natural dispersions and/or measurement errors are taken into account.

Alternatively, in the case where the pressure changes like a pulse after the controlling of the electric current supplied to the coil of the solenoid-operated control valve, if an absolute value of a difference of a base pressure and a peak pressure of the pulse-like pressure change, i.e., the pressure pulse (hereinafter, referred to as the "pulse-like pressure-change amount") is smaller than a failure-judgment threshold value, then it can be judged that the control valve has failed. The base pressure may be a pressure before or after the pulse-like pressure change. As described above, the failure-judgment threshold value may be smaller than a normal pulse-like pressure-change amount. For example, the failure-judgment threshold value may be a value obtained by multiplying the normal pulse-like pressure-change amount by a value smaller than one, or a value obtained by subtracting a value from the normal pulse-like pressure-change amount.

Moreover, in the case where it is known, in advance, that switching of a pressure switch occurs upon controlling of the electric current supplied to the coil of the solenoid-operated control valve, if the switching of the pressure switch does not occur under the same condition, then it can be judged that the control valve has failed.

The controlling of the electric current may be increasing the electric current up from a value greater than zero, or from zero, or decreasing the electric current down to a value greater than zero, or to zero.

(2) The failure detecting apparatus according to the mode (1), further comprising a valve control portion which controls the electric current supplied to the coil of the solenoid-operated control valve, so as to switch the solenoid-operated control valve between the open state thereof and the closed state thereof.

The electric current supplied to the coil may be controlled such that the solenoid-operated control valve is switched from the closed state thereof to the open state thereof or may be controlled such that the control valve is switched from the open state thereof to the closed state thereof. In this case, the failure of the control valve can be more accurately detected as compared with other cases where the movable member is moved in different manners.

(3) The failure detecting apparatus according to the mode (1) or the mode (2), further comprising a condition-dependent valve control portion which controls the electric current supplied to the coil of the solenoid-operated control valve, under a condition that a difference of a high pressure on the high-pressure side of the solenoid-operated control valve and a low pressure on the low-pressure side of the solenoid-operated control valve that is lower than the high pressure is negligible.

(4) The failure detecting apparatus according to any of the modes (1) through (3), wherein the failure detecting portion comprises a peak-pressure-dependent failure detecting portion which detects that the solenoid-operated control valve has failed, when an absolute value of a difference of a base pressure and a peak pressure of a pressure pulse as the change of the pressure detected by the pressure-change detecting device is smaller than an absolute value of a difference of a base pressure and a peak pressure of a pressure pulse as the change of the pressure that results from the change of the volume of the valve chamber caused by the movement of the movable member.

In the case where the pressure changes like a pulse after the controlling of the electric current supplied to the coil of the solenoid-operated control valve, if the pulse-like pressure-change amount is smaller than the failure-judgment threshold value, then it is judged that the control valve has failed. The base pressure may be a pressure before or after the pulse-like pressure change.

The pressure may increase like a pulse (i.e., a positive pressure pulse), or may decrease like a pulse (i.e., a negative pressure pulse).

The base pressure may be an average pressure before or after the pulse-like pressure change, i.e., the pressure pulse. The average pressure before the pressure pulse may be an average pressure before or after the controlling of the electric current supplied to the coil.

In a particular case, for example, in the case where the magnitude of the base pressure has little influence to the magnitude of the peak pressure (e.g., in the case where the peak pressure is much higher than the base pressure, or in the case where the peak pressure is independent of the magnitude of the base pressure), or in the case where the controlling of the electric current supplied to the coil is allowed only when the base pressure is within a reference pressure range (e.g., in the case where a failure of the solenoid-operated control valve is detected only when the base pressure is within the reference pressure range), it can be judged that the control valve has failed, if an absolute value of the peak pressure is smaller than the failure-judgement threshold value.

(5) The failure detecting apparatus according to any of the modes (1) through (4), wherein the solenoid-operated control valve comprises:

a main body which has the valve chamber, a plunger chamber formed at a position remote from the valve chamber, and a guide hole formed between the valve chamber and the plunger chamber;

a seating valve including a valve seat which is provided in the valve chamber, a valve member which is movable toward, and away from, the valve seat, and a spring which defines a position of the valve member relative to the valve seat in a state in which the electromagnetic drive force is not produced;

a solenoid including the coil and a plunger which is provided in the plunger chamber and which produces the electromagnetic drive force; and an electromagnetic-drive-force transmitting member which is provided in the guide hole and transmits the electromagnetic drive force to the valve member, and which cooperates with the valve member to constitute the movable member.

The solenoid-operated control valve may be a normally closed valve in which a spring applies a biasing force to a valve member in a direction to move the valve member toward a valve seat, or a normally open valve in which a spring applies a biasing force to a valve member in a direction to move the valve member away from a valve seat.

(6) The failure detecting apparatus according to the mode (5), wherein the main body of the solenoid-operated control valve further has a communication passage through which the valve chamber and the plunger chamber communicate with each other and which has a flow area through which a working fluid flows, and wherein a ratio of the flow area to an amount of the change of the volume of the valve chamber caused by the movement of the movable member is smaller than a ratio-related reference value.

The main body of the solenoid-operated control valve has at least the valve chamber, the plunger chamber, and the guide hole. The valve member is provided in the valve chamber, the plunger is provided in the plunger chamber, and the electromagnetic-drive-force transmitting member is provided in the guide hole. The valve member and the drive-force transmitting member cooperate with each other to constitute the movable member. When the electric current is supplied to the coil and the electromagnetic drive force is applied to the plunger, the plunger is moved relative to the main body and accordingly the movable member is moved. Because of the movement of the movable member, the volume of the valve chamber is changed on one hand, and the volume of the plunger chamber is changed on the other hand.

If the respective volumes of the valve chamber and the plunger chamber are changed, excess and short of a working fluid (e.g., a working liquid) occur to those chambers. More specifically described, in the case where, as the movable member is moved, the volume of the valve chamber is increased and the volume of the plunger chamber is decreased, the working liquid flows from the plunger chamber toward the valve chamber; and in the case where the volume of the valve chamber is decreased and the volume of the plunger chamber is increased, the working liquid flows from the valve chamber toward the plunger chamber. An amount of the working liquid that flows between the valve chamber and the plunger chamber corresponds to an amount of change of the volume of the valve chamber (that is equal to an amount of change of the volume of the plunger chamber if the electromagnetic-drive-force transmitting member has a constant transverse cross-section area in an axial direction thereof), and the amount of change of the volume is defined by a stroke of movement of the movable member. The movement stroke of the movable member may be determined in advance, or may be defined by a magnitude of the electric current supplied to the coil.

The working liquid flows between the valve chamber and the plunger chamber through the communication passage. Since the electromagnetic-drive-force transmitting member is provided in the guide hole, the communication passage is constituted by a gap provided between an inner circumferential surface of the guide hole and an outer circumferential surface of the transmitting member and/or an axial through-hole that is formed through the transmitting member in the axial direction thereof.

If the excess and short of the working liquid occurring to the valve chamber and the plunger chamber are quickly solved or eliminated, the change of volume of the valve chamber would not produce a detectable pressure change outside the solenoid-operated control valve. However, if not, some working liquid flows into the control valve, or some working liquid flows out of the same, so that the pressure outside the control valve (i.e., the pressure on at least one of the high-pressure side and the low-pressure side of the control valve) changes like a pulse.

According to the mode (6), the solenoid-operated control valve whose failure is to be detected is constructed such that the ratio S/Q of the flow area S of the communication passage to the change amount Q of the volume of the valve chamber is smaller than the ratio-related reference value. The flow area S indicates a degree of easiness of flow of the working liquid between the valve chamber and the plunger chamber, and the change amount Q indicates an amount of the excess or short of the working liquid caused by the volume change of the valve chamber or the plunger chamber, i.e., an amount of the working liquid needed to eliminate the excess or short of the working liquid caused by the volume change. Therefore, it can be said that if the ratio S/Q is too small, then the flow area S may be too small to eliminate the excess or short of the working liquid. Thus, the ratio S/Q can be said as a flow-area index.

The smaller the ratio S/Q is, the more easily the volume change of the valve chamber produces a detectable pressure change (i.e., a pressure pulse or pulsation) outside the solenoid-operated control valve. Thus, the solenoid-operated control valve having the small ratio S/Q is suitable as the object valve whose failure is to be detected. Therefore, the solenoid-operated control valve whose failure is to be detected by the failure detecting apparatus in accordance with the mode (6) is constructed such that the flow-area index (i.e., the ratio S/Q) thereof is smaller than the ratio-related reference value. It is preferred that the ratio-related reference value be smaller than 0.7, and more preferably smaller than 0.5, 0.3, or 0.2.

It is preferred that the pressure-change detecting device be provided in a fluid-tightly closed space on the high-pressure side and/or the low-pressure side of the solenoid-operated control valve, because pressure pulsation can more easily occur to the closed space. The closed space is defined as a space whose volume cannot be changed, or a space whose volume is elastically changed.

(7) The failure detecting apparatus according to the mode (6), wherein the communication passage comprises a gap which is provided between an inner circumferential surface of the guide hole and an outer circumferential surface of the electromagnetic-drive-force transmitting member.

According to the mode (7), the solenoid-operated control valve is constructed such that the communication passage is constituted by the gap provided between the inner circumferential surface of the guide hole and the outer circumferential surface of the electromagnetic-drive-force transmitting member. Thus, the flow area of the communication passage is equal to a value obtained by subtracting the transverse cross-section area of the transmitting member from that of the guide hole. The transmitting member may be one having a circular or polygonal transverse cross-section shape, or one having an axial recess or chamfer that extends in the axial direction thereof.

(8) The failure detecting apparatus according to the mode (6) or the mode (7), wherein the communication passage comprises a through-hole which extends through the electromagnetic-drive-force transmitting member in an axial direction thereof.

Since the electromagnetic-drive-force transmitting member, provided in the guide hole, has the through-hole that extends in the axial direction thereof, the working liquid can flow between the valve chamber and the plunger chamber via the through-hole. Owing to the through-hole, a degree of freedom of designing of the flow area of the communication passage can be improved.

(9) The failure detecting apparatus according to any of the modes (6) through (8), wherein the solenoid-operated control valve comprises a solenoid-operated open-and-close valve in which the movable member is moved over a predetermined stroke at each of a first time when the electric current is supplied to the coil and a second time when the electric current is cut off from the coil, and wherein the ratio of the flow area to the amount of the change of the volume of the valve chamber caused by the movement of the movable member over the predetermined stroke is smaller than the ratio-related reference value.

According to the mode (9), the solenoid-operated control valve is constituted by the solenoid-operated open-and-close valve, and the electric current supplied to the coil of the valve is controlled in an ON-and-OFF manner. Thus, the change amount of the volume of the valve chamber, resulting from the controlling of supplying of the electric current to the coil in the ON-and-OFF manner, is constant and accordingly the flow-area index is constant.

(10) The failure detecting apparatus according to any of the modes (6) through (9), wherein the ratio of the flow area to the amount of the change of the volume of the valve chamber is smaller than a pulsation-production-related reference value as the ratio-related reference value, and is greater than an operation-noise-reduction-related reference value smaller than the pulsation-production-related reference value.

According to the mode (10), the solenoid-operated control valve is constructed such that the flow-area index thereof is greater than the operation-noise-reduction-related reference value, and accordingly the noise produced upon operation of the control valve is reduced.

Since the solenoid-operated control valve is constructed such that the flow-area index thereof is smaller than the pulsation-production-related reference value and is greater than the operation-noise-reduction-related reference value, the pulsation needed to detect the failure can be reliably produced while the operation noise can be effectively reduced. It is desirable that the flow-area index of the control valve be as small as possible, so long as the operation noise does not raise a problem. In other words, it is desirable that the flow-area index of the control valve be as great as possible, so long as the pulsation needed to detect the failure can be produced.

(11) The failure detecting apparatus according to any of the modes (6) through (10), wherein a value, Y, defined by a following expression is greater than an expression-related reference value: $Y = k \cdot (S/Q) + A$ where S is the flow area; Q is the amount of the change of the volume of the valve chamber; k is a negative coefficient; and A is a positive constant.

The value Y is proportional to the magnitude of the pressure pulse or pulsation. Therefore, it is desirable that the value Y of the solenoid-operated control valve as the object valve whose failure to be detected, i.e., the normal pulse-like pressure change of the object valve be greater than the expression-related reference value.

(12) The failure detecting apparatus according to any of the modes (6) through (8), (10), and (11), wherein the solenoid-operated control valve comprises a linear control valve in which the movable member is moved over a stroke corresponding to at least a magnitude of the electric current supplied to the coil, and wherein the failure detecting portion detects whether the solenoid-operated control valve has failed, under a condition that the ratio of the flow area to the amount of the change of the volume of the valve chamber caused by the movement of the movable member over the stroke is smaller than the ratio-related reference value.

Since the solenoid-operated control valve is constituted by the linear control valve, the movement stroke of the movable member is defined by at least the magnitude of the electric current supplied to the coil. Providing that the flow area of the communication passage is constant, the greater the movement stroke of the movable member is, the larger the change amount of the volume of the valve chamber caused by the movement of the movable member is, and accordingly the smaller the flow-area index is. Therefore, it is desirable that the failure of the control valve be detected under a condition that the movement stroke of the movable member is greater than a reference value, that is, the flow-area index (i.e., the ratio S/Q) is smaller than the ratio-related reference value.

(13) The failure detecting apparatus according to any of the modes (1) through (12), wherein the solenoid-operated control valve comprises a master-cylinder shut-off valve as a solenoid-operated open-and-close valve which is normally open and which is provided between (a) a manual hydraulic-pressure source which produces a hydraulic pressure corresponding to an operating force manually applied by a driver to a brake operating member and (b) a brake cylinder of a hydraulic brake which applies, owing to the hydraulic pressure, a hydraulic braking force to a wheel, and wherein the failure detecting portion comprises a master-cylinder-shut-off-valve failure detecting portion which detects whether the master-cylinder shut-off valve has failed, based on the change of the pressure detected by the pressure-change detecting device upon supplying of the electric current to the coil of the master-cylinder shut-off valve.

(14) The failure detecting apparatus according to the mode (13), wherein the pressure-change detecting device comprises a brake-cylinder pressure sensor which is provided between the master-cylinder shut-off valve and the brake cylinder.

The master-cylinder (M/C) shut-off valve is provided between the manual hydraulic-pressure source and the brake cylinder (i.e., wheel cylinder, W/C). More specifically described, the valve chamber of the M/C shut-off valve has two ports one of which is connected to the manual pressure source and the other of which is connected to the brake cylinder. In the case where the valve seat is provided in association with the above-indicated one port, the manual pressure source is communicated with, or shut off from, the valve chamber when the valve member is kept away from, or seated on, the valve seat. However, since the other port is always open, the valve chamber can be always communicated with the brake cylinder.

Since the other port of the valve chamber is connected to the brake cylinder, a liquid-tightly closed space is defined between the other port and the brake cylinder. Thus, it is appropriate to provide the pressure-change detecting device between the M/C shut-off valve and the brake cylinder. In the case where the present failure detecting apparatus is employed a brake system having a W/C-pressure sensor that detects a hydraulic pressure in the brake cylinder (W/C), the W/C-pressure sensor can be utilized as the pressure-change detecting device, without employing a pressure sensor to be used exclusively for detecting the failure of the M/C shut-off valve.

In a state in which the M/C shut-off valve is normal when the electric current is supplied to the coil of the shut-off valve and the shut-off valve is switched from the open state to the closed state, the movable member is moved, and accordingly the volume of the valve chamber is decreased and the volume of the plunger chamber is increased. Since some working liquid flows out of the valve chamber into the closed space on the side of the brake cylinder, the pressure on the side of the bake cylinder is increased like a pulse. However, some working fluid flows into the plunger chamber, the pressure on the side of the bake cylinder is eventually decreased as compared with the pressure before the pulse-like pressure change.

Therefore, for example, if, when the electric current is supplied to the coil of the M/C shut-off valve (i.e., when the shut-off valve should be switched from the open state to the closed state if the valve is normal), an average of pressure values detected by the W/C-pressure sensor after the supplying of the electric current to the coil is not decreased by more than a failure-detection threshold value from an average of pressure values detected by the W/C-pressure sensor before the supplying of the electric current, then it can be judged that the M/C shut-off valve has failed; or, if an absolute value of a difference of a base pressure and a peak pressure after the supplying of the electric current to the coil is smaller than a failure-detection threshold value, then it can also be judged that the M/C shut-off valve has failed.

(15) The failure detecting apparatus according to any of the modes (1) through (14), wherein the solenoid-operated control valve comprises a simulator control valve as a solenoid-operated open-and-close valve which is normally closed and which is provided between (a) a manual hydraulic-pressure source which produces a hydraulic pressure corresponding to an operating force manually applied by a driver to a brake operating member and (b) a stroke simulator which receives and supplies, upon operation of the brake operating member, a working liquid from and to the manual hydraulic-pressure source and thereby applies, to the brake operating member, a reaction force corresponding to the operating force, and wherein the failure detecting portion comprises a simulator-control-valve failure detecting portion which detects whether the simulator control valve has failed, based on the change of the pressure detected by the pressure-change detecting device upon supplying of the electric current to the coil of the simulator control valve.

(16) The failure detecting apparatus according to the mode (15), wherein the pressure-change detecting device comprises a master-cylinder pressure sensor which is provided on one side of the simulator control valve where the manual hydraulic-pressure source is provided.

(17) The failure detecting apparatus according to the mode (15) or the mode (16), wherein the failure detecting portion comprises a brake-cylinder-shut-off-state failure detecting portion which detects whether the simulator control valve has failed, by supplying the electric current to the coil of the simulator control valve in a state in which a master-cylinder shut-off valve which is provided between (a) the manual hydraulic-pressure source and (c) a brake cylinder of a hydraulic brake is in a closed state thereof.

When the electric current is supplied to the coil of the simulator control valve (i.e., when the simulator control valve should be switched from the closed state to the open state if the valve is normal), the volume of the valve chamber is increased and some working liquid flows from outside the control valve into the valve chamber. Consequently the pressure on the side of the manual hydraulic-pressure source is decreased like a pulse. In addition, since the M/C shut-off valve is in the closed state, a liquid-tightly closed space is defined between the simulator control valve and the manual pressure source, and the M/C-pressure sensor is provided in the closed space.

(18) The failure detecting apparatus according to any of the modes (1) through (17), wherein the failure detecting portion comprises an average-pressure-dependent failure detecting portion which detects that the solenoid-operated control valve has failed, when the pressure-change detecting device does not detect that an average of the pressure after the electric current supplied to the coil is so controlled as to switch the solenoid-operated control valve from the open state thereof to the closed state thereof is lower than an average of the pressure before the controlling of the electric current supplied to the coil.

(19) A failure detecting apparatus for detecting a failure of a solenoid-operated control valve which has a coil and is selectively placed in one of an open state thereof and a closed state thereof by an electromagnetic drive force produced upon supplying of an electric current to the coil, the failure detecting apparatus comprising:

a pressure-change detecting device which detects a change of a pressure on at least one of a high-pressure side and a low-pressure side of the solenoid-operated control valve; and a failure detecting portion which detects that the solenoid-operated control valve has failed, based on a change of the pressure detected by the pressure-change detecting device when the electric current supplied to the coil is controlled under a condition that a difference of a high pressure on the high-pressure side of the solenoid-operated control valve and a low pressure on the low-pressure side of the solenoid-operated control valve that is lower than the high pressure is negligible.

The condition that the difference of the high pressure on the high-pressure side of the solenoid-operated control valve and the low pressure on the low-pressure side of the control valve is negligible means a condition that even if the control valve may be in the open state thereof, a working fluid (e.g., a working liquid) does not flow through the control valve from the high-pressure side thereof to the low-pressure side thereof that is, a condition that the difference of the high and low pressures is smaller than a reference value around zero. Thus, the reference value indicates that substantially no working fluid flows through the control valve, and it can be said as being equal to zero if errors or the like are taken into account.

In the failure detecting device disclosed by Patent Document 2, a failure of each of the first and second solenoid-operated control valves is detected under a condition that the each solenoid-operated control valve has a great pressure difference across itself. That is, the failure is detected based on a change of the hydraulic pressure in the hydraulic chamber caused by the flow of the working liquid through the each control valve from the high-pressure side thereof toward the low-pressure side thereof. In contrast, in the failure detecting apparatus in accordance with the mode (19), the failure of the solenoid-operated control valve is detected under the condition that the difference of the high pressure on the high-pressure side of the control valve and the low pressure on the low-pressure side of the control valve is negligible. That is, the failure of the control valve is detected based on the change of the pressure resulting from the change of the volume of the valve chamber caused by the movement of the movable member of the control valve. Thus, the present failure detecting apparatus is distinguished from the failure detecting device disclosed by Patent Document 2.

In addition, since the failure of the solenoid-operated control valve is detected under the condition that the pressure difference is negligible, the failure is more effectively detected as compared with the case where the pressure difference is not negligible, i.e., is considerably large.

The failure detecting apparatus in accordance with the mode (19) may employ one or more technical features in accordance with one or ones of the above-described modes (1) through (18).

(20) The failure detecting apparatus according to any of the modes (1) through (19), further comprising an electric-current control portion which controls the electric current supplied to the coil of the solenoid-operated control valve, when a predetermined failure-detection starting condition is met.

For example, it may be judged that the failure-detection starting condition is met, when at least one of a) a first condition that a vehicle is in a stopped state, b) a second condition that a running speed of a vehicle is not higher than a reference speed, and c) a third condition that an ignition switch has been switched between an ON state and an OFF state is met, or when at least one of the first to third conditions a), b), and c) is met and simultaneously at least one of d) a fourth condition that the solenoid-operated control valve as the object valve has been operated more than a predetermined number of times (e.g., each time the predetermined number is counted up by a counter and the counted-up number is reset to zero) and e) a fifth condition that a vehicle has run more than a predetermined distance (e.g., each time the predetermined distance is counted up by a counter and the counted-up distance is reset to zero) is met. In particular, in the case where the failure-detection starting condition is a condition that the ignition switch has been switched from the OFF state to the ON state, whether the solenoid-operated control valve has failed can be detected or judged before the vehicle's hydraulic brake system employing the present failure detecting apparatus starts its operation.

The failure-detection starting condition may be such a condition that a driver's operation of a brake operating member (e.g., a brake pedal) has been detected.

(21) A solenoid-operated control valve, comprising:

a main body which has a valve chamber, a plunger chamber formed at a position remote from the valve chamber, and a guide hole formed between the valve chamber and the plunger chamber;

a seating valve including a valve seat which is provided in the valve chamber, a valve member which is movable toward, and away from, the valve seat, and a spring which defines a position of the valve member relative to the valve seat in a state in which an electric current is not supplied to a coil;

a solenoid including the coil and a plunger which is provided in the plunger chamber and which produces an electromagnetic drive force upon supplying of the electric current to the coil; and an electromagnetic-drive-force transmitting member which is provided in the guide hole and transmits the electromagnetic drive force to the valve member, and which cooperates with the valve member to constitute a movable member, wherein the main body further has a communication passage through which the valve chamber and the plunger chamber communicate with each other and which has a flow area through which a working fluid flows, and wherein a ratio of the flow area to an amount of the change of the volume of the valve chamber caused by the movement of the movable member is smaller than an upper-limit reference value.

The solenoid-operated control valve in accordance with the mode (21) is suitable for detection of a failure thereof.

(22) A solenoid-operated control valve, comprising:

a main body which has a valve chamber, a plunger chamber formed at a position remote from the valve chamber, and a guide hole formed between the valve chamber and the plunger chamber;

a seating valve including a valve seat which is provided in the valve chamber, a valve member which is movable toward, and away from, the valve seat, and a spring which defines a position of the valve member relative to the valve seat in a state in which an electric current is not supplied to a coil;

a solenoid including the coil and a plunger which is provided in the plunger chamber and which produces an electromagnetic drive force upon supplying of the electric current to the coil; and an electromagnetic-drive-force transmitting member which is provided in the guide hole and transmits the electromagnetic drive force to the valve member, and which cooperates with the valve member to constitute a movable member, wherein the main body further has a communication passage through which the valve chamber and the plunger chamber communicate with each other and which has a flow area through which a working fluid flows, and wherein a ratio of the flow area to an amount of the change of the volume of the valve chamber caused by the movement of the movable member is greater than a lower-limit reference value.

The solenoid-operated control valve in accordance with the mode (22) can be advantageously used as the object valve whose failure is to be detected by the failure detecting apparatus in accordance with any of the modes (1) through (20), and additionally can enjoy improved reduction of its own operation noise.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described in detail, by reference to the drawings, an embodiment of the present invention that relates to a failure detecting apparatus employed by a hydraulic brake system.

Figure 1:
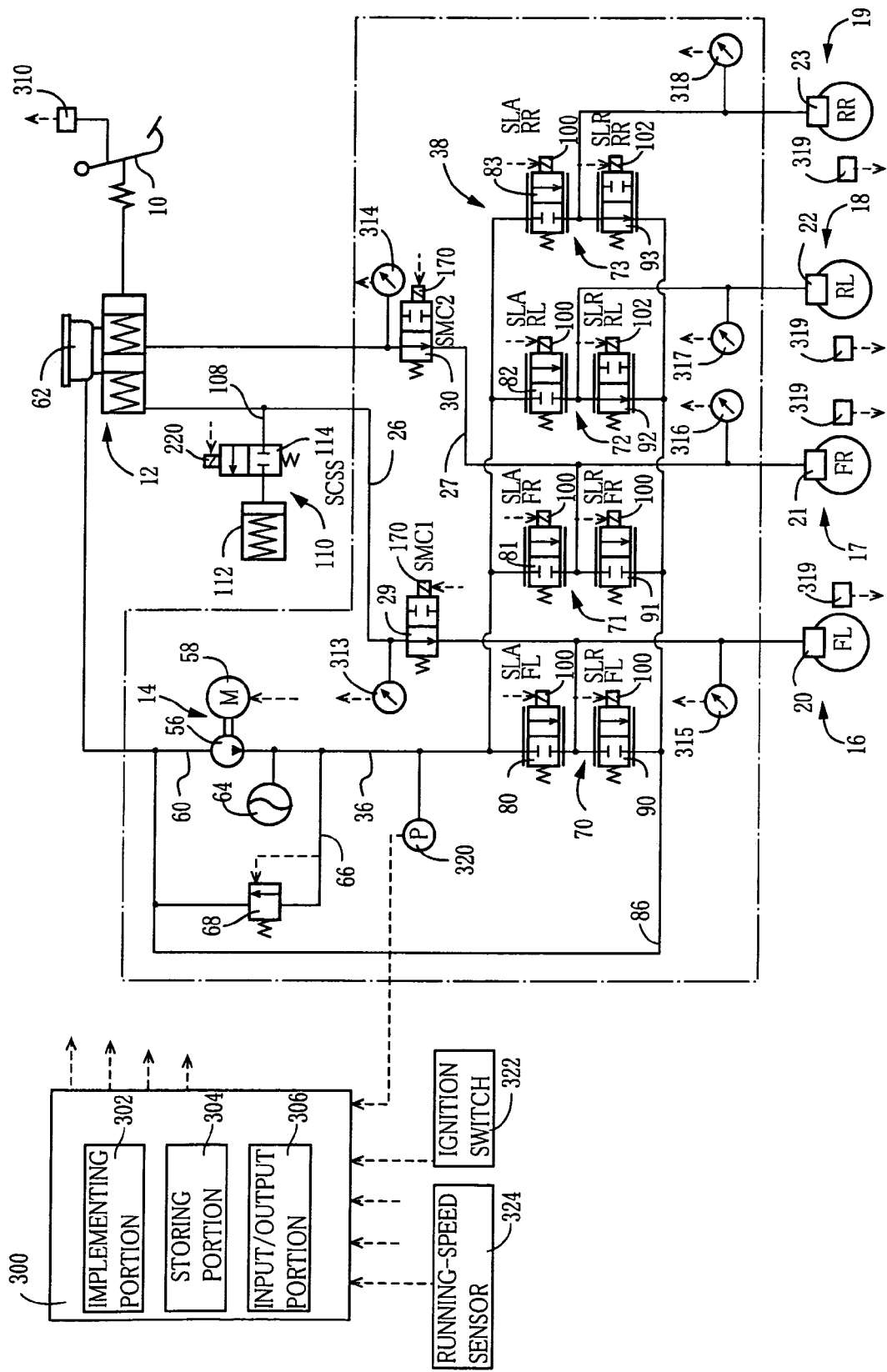
FIG. 1 is a diagrammatic view of a hydraulic braking system including a failure detecting apparatus to which the present invention is applied.

FIG. 1 diagrammatically shows the hydraulic brake system including a brake pedal 10 as a brake operating member; a master cylinder ("M/C") 12 as a manual pressure source; a pump device 14 as a power pressure source that produces, by utilizing electric power, a hydraulic pressure; and four hydraulic brakes 16, 17, 18, 19 that are associated with a front and left wheel FL, a front and right wheel FR, a rear and left wheel RL, and a rear and right wheel RR of an automotive vehicle, respectively.

The four hydraulic brakes 16 through 19 include respective brake cylinders (i.e., wheel cylinders "W/C") 20, 21, 22, 23, and each of the hydraulic brakes 16 through 19 applies a braking torque to a corresponding one of the four wheels FL, FR, RL, RR, upon supplying of a hydraulic pressure to a corresponding one of the brake cylinders 20 through 23.

The M/C 12 includes two pressurizing pistons, and two pressurizing chambers which are provided in front of the two pressurizing pistons, respectively, and each of which produces a hydraulic pressure corresponding to a driver's operating force applied to the brake pedal 10. The two pressurizing chambers of the M/C 12 are connected via respective M/C passages 26, 27 to the two brake cylinders 20, 21 corresponding to the front left and right wheels FL, FR. Two M/C shut-off valves 29, 30 are provided in the two M/C passages 26, 27, respectively. Each of the two M/C shut-off valves 29, 30 is constituted by a normally open solenoid-operated open/close valve.

The pump device 14 is connected via a pump passage 36 to the four brake cylinders 20 through 23. In a state in which the two brake cylinders 20, 21 are shut off from the M/C 12, the pump device 14 supplies a hydraulic pressure to each of the four brake cylinders 20 through 23 so as to operate a corresponding one of the hydraulic brakes 16 through 19. The respective hydraulic pressures supplied to the four brake cylinders 20 through 23 are controlled by a hydraulic-pressure control valve device 38.

The pump device 14 includes a pump 56, and a pump motor 58 that drives the pump 56. The pump 56 is connected to a master reservoir 62 via an intake passage 60 provided on an input side of the pump 56, and is additionally connected to an accumulator 64 via the pump passage 36 provided on an output side of the pump 56. The pump 56 pumps up a working liquid from the master reservoir 62, and supplies the pressurized working liquid to the accumulator 64 so that the pressurized liquid is stored by the accumulator 64. A relief passage 66 connects between the intake passage 60 located on the input side of the pump 56, and the pump passage 36 located on the output side of the pump 56, and a relief valve 68 is provided in the relief passage 66. When a hydraulic pressure in the accumulator 64 that is higher than a hydraulic pressure in the master reservoir 62 exceeds a pre-set pressure, the relief valve 68 is switched from a closed state thereof to an open state thereof.

The hydraulic-pressure control valve device 38 includes four individual pressure control valve devices 70, 71, 72, 73 corresponding to the four brake cylinders 20, 21, 22, 23, respectively. The four individual pressure control valve devices 70, 71, 72, 73 include respective pressure-increase linear valves 80, 81, 82, 83, each as a solenoid-operated pressure-increase control valve, that are provided in the pump passage 36; and respective pressure-decrease linear valves 90, 91, 92, 93, each as a solenoid-operated pressure-decrease control valve, that are provided in a pressure-decrease passage 86 that connects between the corresponding brake cylinders 20, 21, 22, 23 and the master reservoir 62. The respective hydraulic pressures in the four brake cylinders 20 through 23 can be controlled independent of each other, by controlling the four individual pressure control valve devices 70 through 73 (i.e., the four pressure-increase linear valves 80 through 83 and the four pressure-decrease linear valves 90 through 93) independent of each other.

The four pressure-increase linear valves 80 through 83 corresponding to the four wheels FL, FR, RL, RR, and the two pressure-decrease linear valves 90, 91 corresponding to the two front wheels FL, FR include respective coils 100, and are each a normally closed valve that is kept to a closed state thereof while no electric current is supplied to the coil 100; and the two pressure-decrease linear valves 92, 93 corresponding to the two rear wheels RL, RR include respective coils 102, and are each a normally open valve that is kept to an open state thereof while no electric current is supplied to the coil 102.

The respective hydraulic pressures in the four brake cylinders 20 through 23 are controlled to respective values corresponding to the respective electric currents supplied to the coils 100, 102.

A stroke simulator device 110 is connected via a liquid passage 108 to the M/C passage 26. The stroke simulator device 110 includes a stroke simulator 112, and a simulator control valve 114 that is a normally closed solenoid-operated valve. When the simulator control valve 114 is opened and closed, the stroke simulator 112 is switched to a communication state thereof in which the simulator 112 communicates with the M/C 12 and to a shut-off state thereof in which the simulator 112 is shut off from the M/C 12, respectively. In the present embodiment, the simulator control valve 114 is opened when the hydraulic brakes 16 through 19 are operated by the working liquid supplied from the pump device 14; and the control valve 114 is closed when the hydraulic brakes 16 through 19 are operated by the working liquid supplied from the M/C 12.

Figure 2:
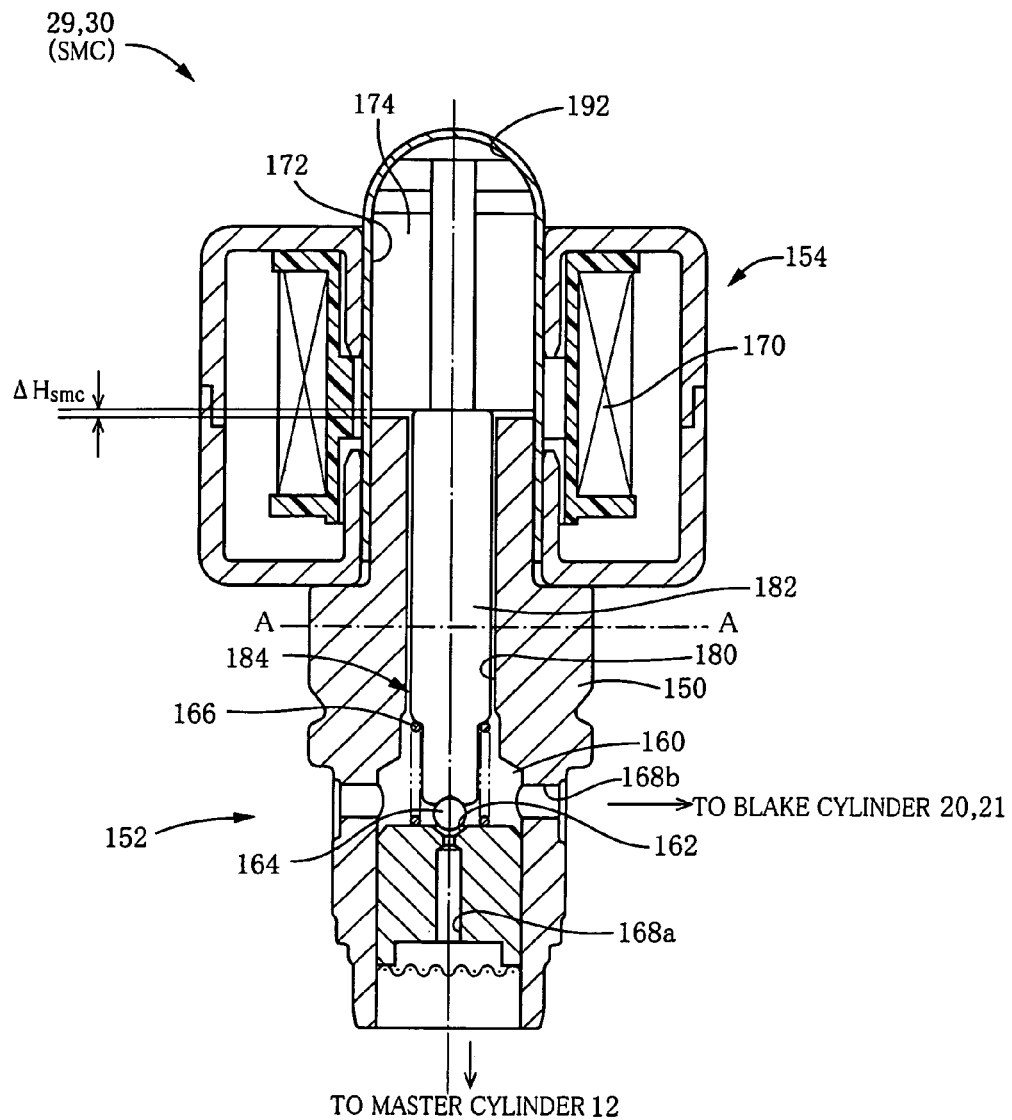
FIG. 2 is a cross-section view of an object valve whose failure is detected by the failure detecting apparatus.
Figure 3:
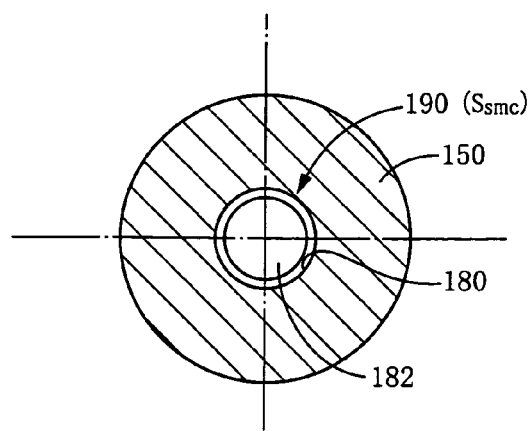
FIG. 3 is a cross-section view taken along A-A in FIG. 2.
Figure 4:
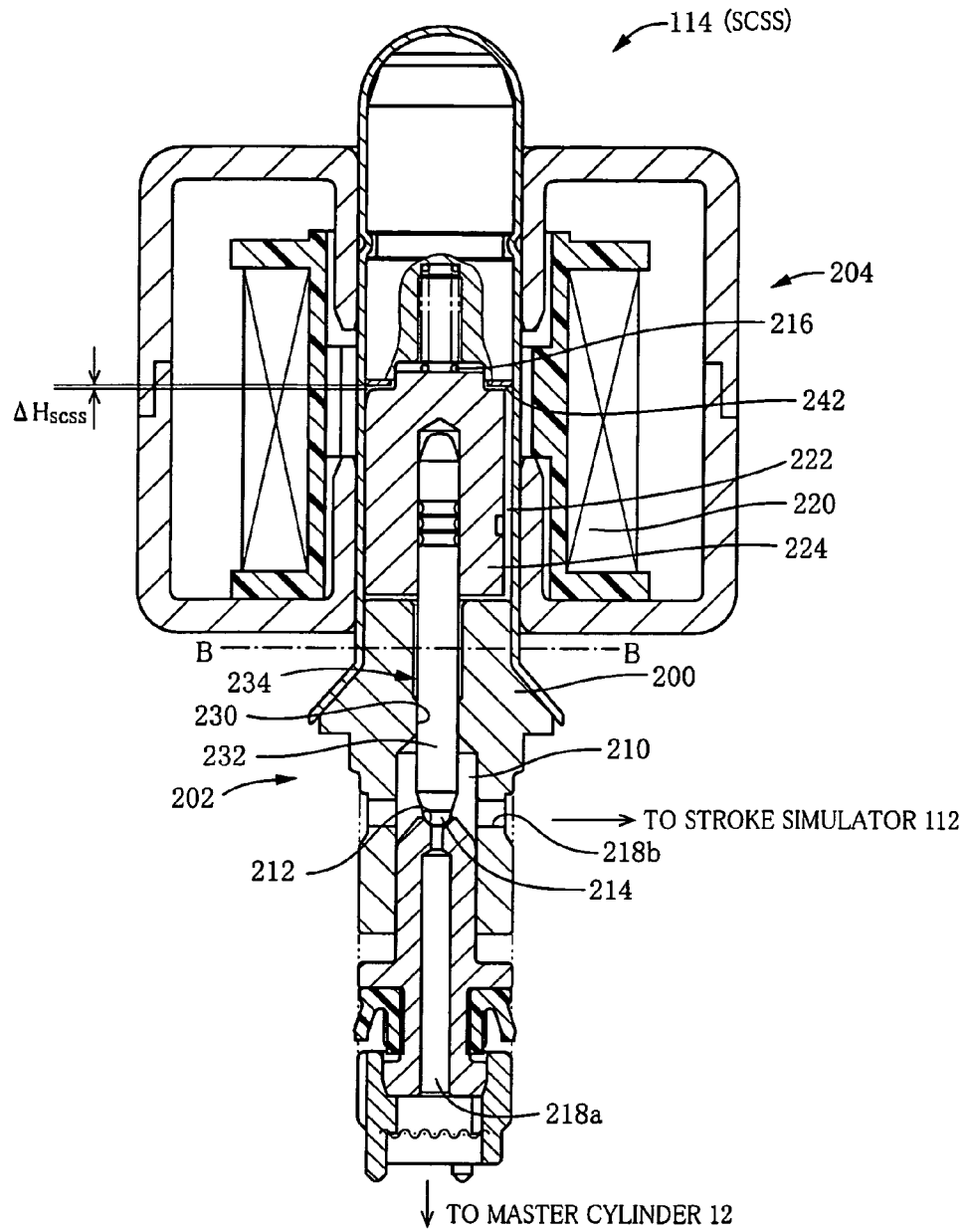
FIG. 4 is a cross-section view of another object valve whose failure is detected by the failure detecting apparatus.
Figure 5:
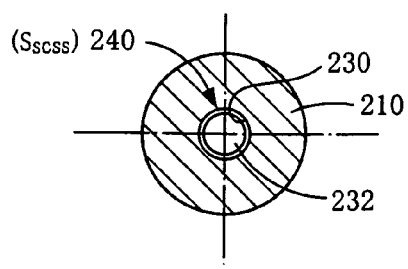
FIG. 5 is a cross-section view taken along B-B in FIG. 4.

FIGS. 2 and 3 show the M/C shut-off valve 29, 30 as the normally open valve; and FIGS. 4 and 5 show the simulator control valve 114 as the normally closed valve.

As shown in FIG. 2, each of the two M/C shut-off valves 29, 30 includes a main body 150, a seating valve 152, and a solenoid 154.

The seating valve 152 includes a valve seat 162 that is provided in a valve chamber 160 formed in the main body 150; a valve member 164 that is movable toward and away from the valve seat 162; and a spring 166 that biases the valve member 164 in a direction to move the same 164 away from the valve seat 162. A first port 168a that opens in the valve chamber 160 is connected to a first portion of the M/C passage 26, 27 that is located on the side of the M/C 12; and a second port 168b that that also opens in the valve chamber 160 is connected to a second portion of the M/C passage 26, 27 that is located on the side of the corresponding brake cylinder 20, 21. The second port 168b remains open even in the state in which the valve member 160 is seated on the valve seat 162.

The solenoid 154 includes a coil 170 fixed to the main body 150; and a plunger 174 that is provided in a plunger chamber 172 that is formed, in the main body 150, at a position remote from the valve chamber 160. When an electric current is supplied to the coil 170, an electromagnetic drive force is applied to the plunger 174, so that the plunger 174 is moved toward the main body 150. Thus, the plunger 174 is a movable plunger.

The main body 150 has, at a position between the valve chamber 160 and the plunger chamber 172, a guide hole 180 that communicates with each of the valve chamber 160 and the plunger chamber 172. The guide hole 180 receives a shaft 182 as an electromagnetic-drive-force transmitting member. In the present embodiment, the shaft 182 is integral with the valve member 164 and cooperates with the same 164 to provide an integral movable member 184 that is movable in an axial direction of the guide hole 180. The shaft 182 is provided such that one end of the shaft 182 that is opposite to the valve member 164 is in butting contact with the plunger 174.

As shown in FIG. 3, a gap present between an inner circumferential surface of the guide hole 180 and an outer circumferential surface of the shaft 182 defines a communication passage 190 through which the valve chamber 160 and the plunger chamber 172 communicate with each other. A flow area, $S_{smc}$, of the communication passage 190 is obtained by subtracting a transverse cross-section area of the shaft 182 from that of the guide hole 180. Assuming that a difference of respective hydraulic pressures in the valve chamber 160 and the plunger chamber 172 does not change, an amount of the working liquid that flows through the communication passage 190 increases as the flow area $S_{smc}$ increases, and a time needed for a unit amount of the working liquid to flow through the passage 190 decreases.

FIG. 2 shows a state in which no electric current is supplied to the coil 170, i.e., the valve member 164 is kept away from the valve seat 162. A backward-movement limit position of the plunger 174 is defined by butting contact of a rear end of the plunger 174 with an inner surface 192 of the plunger chamber 172.

When the electric current is supplied to the coil 170, the plunger 174 is driven by an electromagnetic drive force in a direction to move toward the main body 150. Thus, the plunger 174 is moved forward, and the shaft 182 and the valve member 164 are moved forward against the biasing force of the spring 166, so that the valve member 164 is seated on the valve seat 162. Meanwhile, when the electric current is cut off from the coil 170, the valve member 164 is moved away from the valve seat 162 by the biasing force of the spring 166.

Thus, the electric current supplied to the coil 170 of each of the M/C shut-off valves 29, 30 is controlled in an ON/OFF manner, so that the movable member 184 is moved by a predetermined stroke, $\Delta H_{smc}$. That is, an amount of change, $\Delta V_{smc}$, of a volume of the valve chamber 160 caused by the ON/OFF control of the electric current is determinable. In the present embodiment, the amount of change $\Delta V_{smc}$ is equal to the product of the stroke $\Delta H_{smc}$ of the shaft 182 and the cross-section area $S_{smc}$ of the same 182, i.e., $\Delta V_{smc} = \Delta H_{smc} \cdot S_{smc}$. The amount of change $\Delta V_{smc}$ corresponds to an amount of the working liquid that flows between the valve chamber 160 and the plunger chamber 172 through the communication passage 190, i.e., an amount of excess or shortage of the working liquid caused by the movement of the movable member 184. In the present embodiment, since the cross-section area $S_{smc}$ of the shaft 182 does not change in the axial direction, the amount of change $\Delta V_{smc}$ of the volume of the valve chamber 160 is equal to an amount of change of the volume of the plunger chamber 172.

Therefore, a ratio ($S_{smc}/\Delta V_{smc}$) of the flow area $S_{smc}$ of the communication passage 190 to the change amount $\Delta V_{smc}$ of the volume of the valve chamber 160 is an index indicating a degree of easiness of compensation of the excess or shortage of the working liquid. A value of the ratio $S_{smc}/\Delta V_{smc}$ that is too low indicates a value of the flow area $S_{smc}$ that is too small. Thus, the ratio $S_{smc}/\Delta V_{smc}$ can be said as a flow-area index. The lower the flow-area index $S_{smc}/\Delta V_{smc}$ is, the more likely pulsation is to occur when the volume of the valve chamber 160 changes, and the more easily a failure of the M/C shut-off valve 29, 30 is detected. In addition, the higher the flow-area index $S_{smc}/\Delta V_{smc}$ is, the less likely the pulsation is to occur when the volume of the valve chamber 160 changes, but the more noise caused by operation of the valve 29, 30 is reduced.

Hence, in the present embodiment, the flow-area index $S_{smc}/\Delta V_{smc}$ of each of the M/C shut-off valves 29, 30 is higher than a noise-reduction-related threshold and lower than a failure-detection-related threshold. For example, it is preferred that the flow-area index $S_{smc}/\Delta V_{smc}$ not lower than 0.3, more preferably not lower than 0.5, most preferably not lower than 0.7, and be not higher than 0.8, more preferably not higher than 0.6, most preferably not higher than 0.4 or 0.2.

As shown in FIG. 4, the simulator control valve 114 includes a main body 200, a seating valve 202, and a solenoid 204. The seating valve 202 includes a valve seat 212 that is provided in a valve chamber 210 formed in the main body 200; a valve member 214 that is movable toward and away from the valve seat 212; and a spring 216 that biases the valve member 214 in a direction to move the same 214 toward the valve seat 212. A first port 218a that opens in the valve chamber 210 is connected to a first portion of the liquid passage 108 that is located on the side of the M/C 12; and a second port 218b that also opens in the valve chamber 210 is connected to a second portion of the liquid passage 108 that is located on the side of the stroke simulator 112.

The solenoid 204 includes a coil 200 fixed to the main body 200; and a plunger 224 that is provided in a plunger chamber 222 that is formed in the main body 200, at a position remote from the valve chamber 210.

The main body 200 has, at a position between the valve chamber 210 and the plunger chamber 222, a guide hole 230 that communicates with each of the valve chamber 210 and the plunger chamber 222. The guide hole 230 receives a shaft 232 as an electromagnetic-drive-force transmitting member. The shaft 232 is provided such that the shaft 232 is movable as a unit with the plunger 224. In the present embodiment, the valve member 214, the shaft 232, and the plunger 224 cooperate with each other to provide an integral movable member 234. As shown in FIG. 5, a gap present between an inner circumferential surface of the guide hole 230 and an outer circumferential surface of the shaft 232 defines a communication passage 240 through which the valve chamber 210 and the plunger chamber 222 communicate with each other. Like the flow area $S_{smc}$ of the communication passage 190 of each of the M/C shut-off valves 29, 30, a flow area, $S_{scss}$, of the communication passage 240 is obtained by subtracting a transverse cross-section area of the shaft 232 from that of the guide hole 230.

FIG. 4 shows a state in which no electric current is supplied to the coil 220, i.e., the valve member 214 is kept seated on the valve seat 212. When an electric current is supplied to the coil 220, the plunger 224 is driven by an electromagnetic drive force in a backward direction. Thus, the plunger 224 is moved backward against the biasing force of the spring 216, till the plunger 224 butts on an end surface 242 of the main body 200 that functions as a stopper defining a backward-movement limit position of the plunger 224. Consequently the shaft 232 and the valve member 214 are also moved backward, so that the valve member 214 is moved away from the valve seat 212. Meanwhile, when the electric current is cut off from the coil 220, the valve member 214 is seated on the valve seat 212 by the biasing force of the spring 216.

Thus, the electric current supplied to the coil 220 of the simulator control valve 114 is controlled in an ON/OFF manner, so that the movable member 234 is moved by a predetermined stroke, $\Delta H_{scss}$. In the present embodiment, an amount of change, $\Delta V_{scss}$, of the volume of the valve chamber 210 is equal to an amount of change of the volume of the plunger chamber 222, and is equal to the product of the stroke $\Delta H_{scss}$ of the shaft 232 and the cross-section area $S_{scsss}$ of the same 232, i.e., $\Delta V_{scss} = \Delta H_{scss} \cdot S_{scsss}$. Like the flow-area index $S_{smc}/\Delta V_{smc}$ with respect to each of the M/C shut-off valves 29, 30, a flow-area index $S_{scss}/\Delta V_{scss}$ with respect to the simulator control valve 114 is higher than a noise-reduction-related threshold value and lower than a failure-detection-related threshold value.

Each of the pressure-increase linear valves 80, 81, 82, 83 and the pressure-decrease linear valves 90, 91 each of which is a normally closed valve has a construction similar to that of the above-described simulator control valve 114. However, an electric current supplied to a coil of the each linear valve 80 through 83, 90, 91 can be continuously changed. A position of a valve member of the each linear valve relative to a valve seat thereof is defined by a relationship between an electromagnetic force, Fd, corresponding to the electric current, a pressure-difference-caused force, Fp, corresponding to a pressure difference across the each linear valve, and a biasing force, Fs, of a spring of the each linear valve. Thus, the hydraulic pressure supplied to each of the brake cylinders 20, 21, 22, 23 can be continuously controlled.

Each of the pressure-decrease linear valves 92, 93 each of which is a normally open valve has a construction similar to that of the above-described M/C shut-off valves 29, 30. However, an electric current supplied to a coil of the each linear valve 92, 93 can be continuously changed. Each of the pressure-decrease linear valves 92, 93 is provided between a corresponding one of the brake cylinders 22, 23 and the reservoir 62, such that a pressure-difference-caused force, Fp, corresponding to a difference of the respective hydraulic pressures in the corresponding brake cylinder 22, 23 and the reservoir 62 is applied to a valve member of the each linear valve 92, 93. When an electric current is supplied to the coil of the each linear valve 92, 93, an electromagnetic force, Fd, corresponding to the electric current is applied to the valve member in a direction to move the same toward a vale seat of the each linear seat. Thus, a position of the valve member of the each linear valve 92, 93 relative to the valve seat thereof is defined by a relationship between the electromagnetic force Fd, the pressure-difference-caused force Fp, and a biasing force, Fs, of a spring of the each linear valve. Thus, the hydraulic pressure supplied to each of the brake cylinders 22, 23 can be continuously controlled.

The hydraulic brake system is controlled based on commands supplied from a brake ECU (electronic control unit) 300, shown in FIG. 1. The brake ECU 300 is essentially constituted by a computer including an implementing portion 302, a storing portion 304, and an input-and-output (I/O) portion 306. A stroke sensor 310, two M/C-pressure sensors 313, 314, four brake-pressure sensors 315, 316, 317, 318, four wheel-speed sensors 319, a pressure-source-pressure sensor 320, an ignition switch 322, and a running-speed sensor 324 that detects a running speed of the vehicle are connected to the I/O portion 306. In addition, the respective coils 100 of the four pressure-increase linear valves 80 through 83 and the two pressure-decrease linear valves 90, 91, the respective coils 102 of the two pressure-decrease linear valves 92, 93, and the respective coils 170, 220 of the M/C shut-off valves 29, 30 and the simulator control valve 114 are connected to the I/O portion 306 via respective switch circuits, not shown, and the pump motor 58 is connected to the I/O portion 306 via a drive circuit, not shown.

Figure 6:
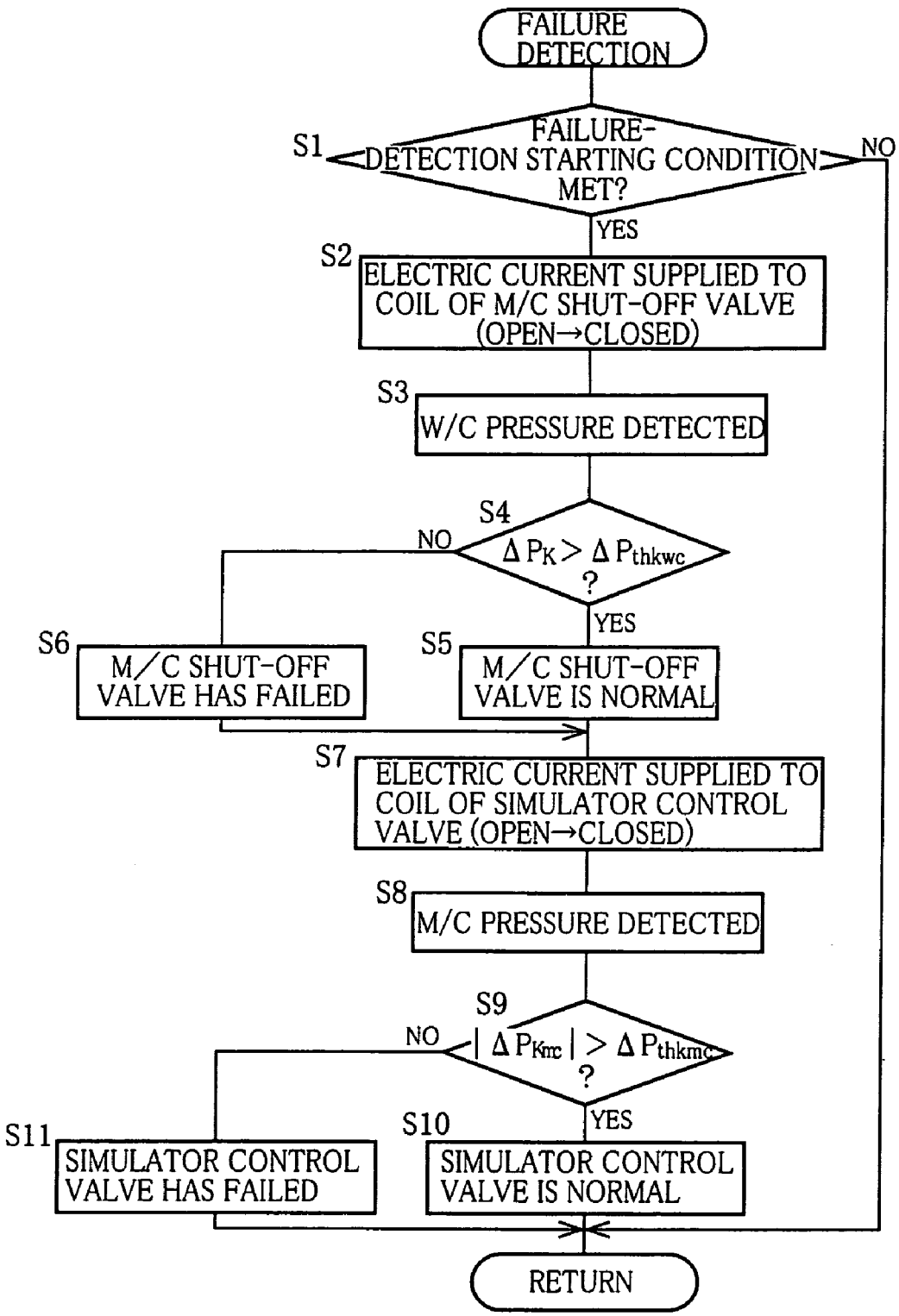
FIG. 6 is a flow chart representing a failure detection program stored by a storing portion of the failure detecting apparatus.

The storing portion 304 stores various control programs such as a failure detection program represented by a flow chart shown in FIG. 6.

When the hydraulic brakes 16 through 19 are operated, first, the two M/C shut-off valves 29, 30 are closed so as to shut off the M/C 12 from the two brake cylinders 20, 21, and the simulator control valve 114 is opened so as to allow the M/C 12 to communicate with the stroke simulator 112. In this state, the respective electric currents supplied to the respective coils 100, 102 of the four pressure-increase linear valves 80 through 83 and the pressure-decrease linear valves 90 through 93 are controlled so that respective actual hydraulic pressures in the four brake cylinders 20 through 23 may approach respective target hydraulic pressures.

When a usual braking operation is being performed, the respective target hydraulic pressures of the four brake cylinders 20 through 23 are determined based on an operation state of the brake pedal 10 being operated by a driver. More specifically described, a required braking force is determined based on at least one of an operating stroke of the brake pedal 10 and an operating force (corresponding to the M/C pressure) applied to the same 10, and respective target hydraulic pressures of the four brake cylinders 20 through 23 are so determined as to be able to apply the required braking force to the four wheels of the vehicle.

Meanwhile, when an anti-lock (or anti-block) braking control is being performed, respective target hydraulic pressures of the four brake cylinders 20 through 23 are so determined that respective slipping states of the four wheels being braked become appropriate for a friction coefficient of a road surface on which the vehicle is running; and when a vehicle stability control is being performed, respective target hydraulic pressures of the four brake cylinders 20 through 23 are so determined that respective lateral-direction slipping states of the four wheels become appropriate for a friction coefficient of a road surface on which the vehicle is running. In those cases, a target hydraulic pressure is determined for each of the four brake cylinders 20 through 23, i.e., each of the four wheels FL, FR, RL, RR.

If a predetermined failure-detection starting condition is met, the brake ECU 300 starts detecting whether each of the two M/C shut-off valves 29, 30 and the simulator control valve 114 has failed, based on a change of pressure (i.e., a pressure pulse or pulsation) caused by a change of volume of a corresponding one of the respective valve chambers 160, 210 of those valves 29, 30, 114 that is caused by movement of a corresponding one of the respective movable members 184, 234 of the same 29, 30, 114.

Figure 10:
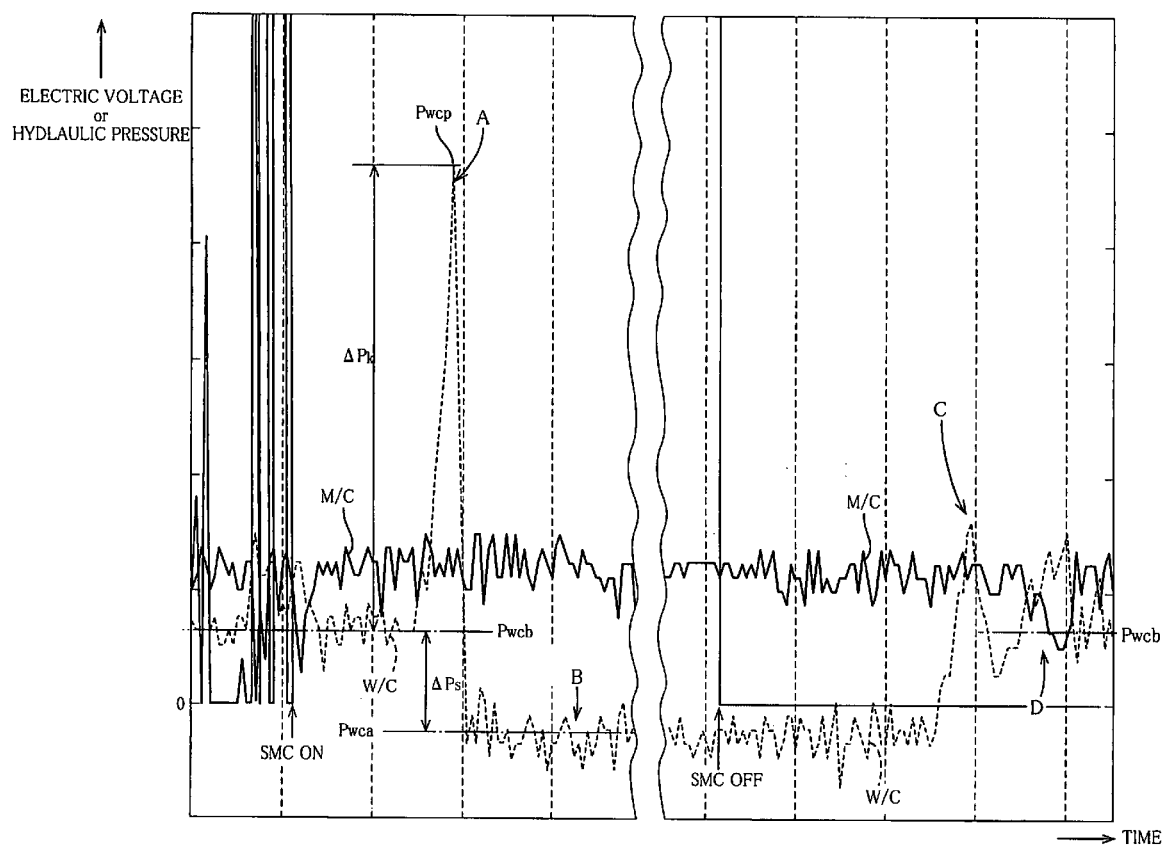
FIG. 10 is a graph showing a change of hydraulic pressure when a master-cylinder (M/C) shut-off valve as the object valve is normal.

FIG. 10 shows a change of pressure caused by a change of a volume of the valve chamber 160 caused by movement of the movable member 184 when each M/C shut-off valve 29, 30 is normal. The pressure values shown in FIG. 10 were experimentally measured. In the present embodiment, the W/C-pressure sensors 315, 316 are each utilized as a pressure-change detecting device.

Since respective failures of the two M/C shut-off valves 29, 30 are detected in a same method, the following description relates to detection of a failure of the M/C shut-off valve 29.

In a state in which the M/C shut-off valve 29 is open, the hydraulic pressure in a portion of the liquid passage 26 that is located on a M/C (master-cylinder) side of the valve 29 and the hydraulic pressure in another portion of the liquid passage 26 that is located on a W/C (brake-cylinder) side of the valve 29 should be theoretically equal to each other. In other words, a difference of the two hydraulic pressures should be very small, i.e., smaller than a pre-set value around zero. Thus, no working liquid flows in the liquid passage 26 through the M/C shut-off valve 29 that is open. The respective hydraulic pressures on either side of the valve 29 may be equal to an atmospheric pressure, or higher than the atmospheric pressure.

When the electric current is supplied to the coil 170 of the M/C shut-off valve 29, the movable member 184 is moved forward, and the valve member 164 is seated on the valve seat 162, so that the volume of the valve chamber 160 decreases and the volume of the plunger chamber 172 increases.

Since the volume of the valve chamber 160 decreases, the W/C-pressure sensor 315 that communicates with the valve chamber 160 detects a pulse-like increase of the hydraulic pressure, as indicated at "A" in FIG. 10. Then, when a certain amount of the working liquid flows from the valve chamber 160 toward the plunger chamber 174, an average hydraulic pressure, $P_{wca}$, detected by the sensor 315 becomes lower, as indicated at "B" in FIG. 10, than an average pressure, $P_{wcb}$, (before the pulse-like increase A) in the state in which the valve 29 is open.

Then, when the electric current is cut off from the coil 170, the M/C shut-off valve 29 is switched to the open state thereof, so that the movable member 184 is moved backward. Thus, the volume of the valve chamber 160 increases and the volume of the plunger chamber 172 decreases. In addition, since the valve chamber 160 is allowed to communicate with the M/C 12, the valve chamber 160 and the brake cylinder (W/C) 20 are supplied with the working liquid from the M/C 12. Therefore, as indicated at "C" in FIG. 10, the WC-pressure sensor 315 detects a pulse-like increase of the hydraulic pressure. In addition, when a certain amount of the working liquid flows from the plunger chamber 174 toward the valve chamber 160, the hydraulic pressure detected by the sensor 315 returns to the average pressure $P_{wcb}$ before the closing and opening of the valve 29, as indicated at "D" in FIG. 10.

Thus, when the M/C shut-off valve 29 is normal, the hydraulic pressure detected by the W/C-pressure sensor 315 shows a pulse-like change upon supplying of electric current to the coil 170 of the valve 29. A difference, $\Delta P_k$, of a peak pressure, $P_{wcp}$, and a base pressure, $P_{wcb}$, of the pulse-like change (hereinafter, referred to as the "pulse-like change amount $\Delta P_k$"), and an average pressure decrease, $\Delta P_s$ ($=P_{wcb}-P_{wca}$), when the valve 29 is switched from the open state thereof to the closed state thereof (hereinafter, referred to as the "average pressure change amount $\Delta P_s$") are experimentally measured.

In the present embodiment, based on the pulse-like change amount $\Delta P_k$ and the average pressure change amount $\Delta P_s$ that are experimentally measured when the M/C shut-off valve 29 is normal, two failure detection threshold values, $\Delta P_{thkwc}$ and $\Delta P_{thswc}$, are determined. If a pulse-like change amount $\Delta P_k$ actually detected from an object valve is not greater than the failure detection threshold value $\Delta P_{thkwc}$, or if an average pressure change amount $\Delta P_s$ actually detected from an object valve is not greater than the failure detection threshold value $\Delta P_{thswc}$, it can be judged that the M/C shut-off valve 29 as the object valve has mechanically failed, i.e., has such a failure that the movable member 184 thereof cannot be moved.

Thus, the two failure detection threshold values $\Delta P_{thkwc}$ and $\Delta P_{thswc}$ are determined based on values measured by experiments or the like, more specifically described, are so determined as to be values smaller than the experimentally measured values while natural dispersions of the pressure change and/or errors of the measurement are/is taken into consideration.

A failure can be detected based on either a pressure change caused by switching of the M/C shut-off valve 29 from the open state to the closed state, or a pressure change caused by switching of the valve 29 from the closed state to the open state. However, since a greater pressure change amount can be observed, as shown in FIG. 10, when the M/C shut-off valve 29 is switched from the open state to the closed state than when the valve 29 is switched from the closed state to the open state, a failure of the valve 29 can be detected more accurately when the valve 29 is switched from the open state to the closed state.

Figure 11:
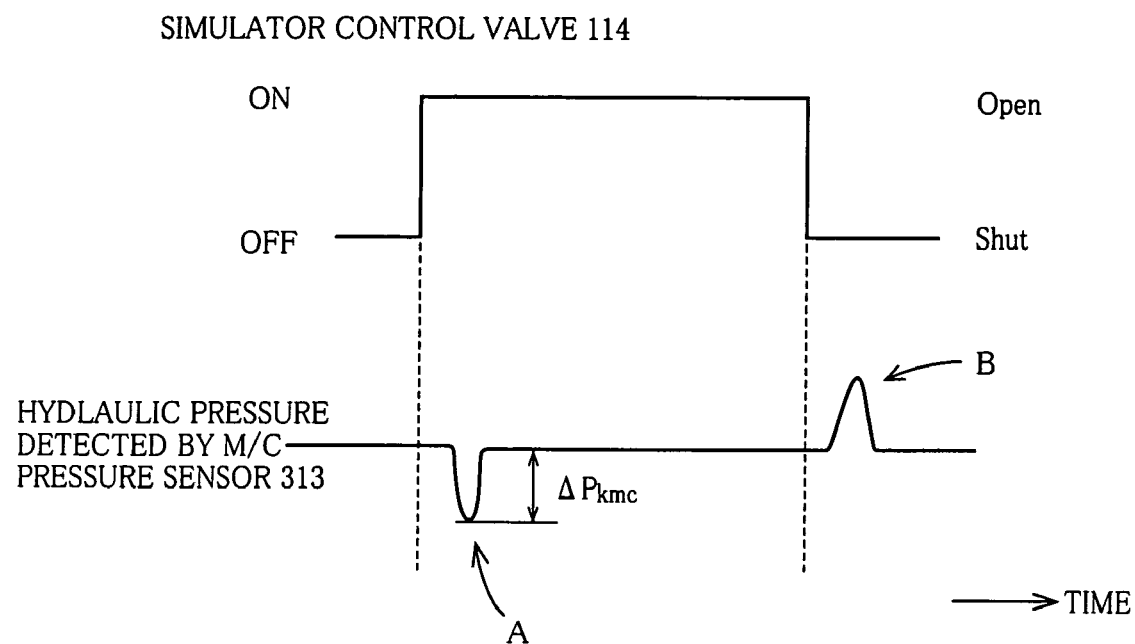
FIG. 11 is a graph showing a change of hydraulic pressure when a simulator control valve as the object valve is normal.

FIG. 11 shows a change of pressure resulting from a change of the volume of the valve chamber 210 caused by a movement of the movable member 234 when the simulator control valve 114 is normal. Since the simulator control valve 114 is a normally closed valve, the valve 114 is switched from the closed state to the open state when the electric current is supplied to the coil 220 of the valve 114. Since the movable member 234 is moved backward, the volume of the valve chamber 210 increases and a volume of the plunger chamber 222 decreases. Since an amount of the working liquid that corresponds to the increased amount of the volume of the valve chamber 210 is supplied from the M/C 12 to the valve chamber 210, the hydraulic pressure detected by the M/C pressure sensor 313 shows a pulse-like decrease, as indicated at "A" in FIG. 11.

Then, when the simulator control valve 114 is switched from the open state to the closed state, the volume of the valve chamber 210 decreases and the volume of the plunger chamber 222 increases. The hydraulic pressure detected by the M/C pressure sensor 313 shows a pulse-like increase, as indicated at "B" in FIG. 11. Since the M/C 12 or the liquid passage 26 is shut off from the valve chamber 210 in the state in which the simulator valve 114 is closed, the sensor 313 is not influenced by the flows of the working liquid between the valve chamber 210 and the plunger chamber 222.

In this case, too, a pulse-like change amount, $\Delta P_{kmc}$, is experimentally measured, and a failure detection threshold value, $\Delta P_{thkmc}$, for the simulator control valve 114 is determined based on the experimentally measured pulse-like change amount $\Delta P_{kmc}$, and stored in the storing portion 304.

A failure detecting operation is carried out when a predetermined failure-detection starting condition is met. In the present embodiment, it is judged that the failure-detection starting condition is met, when at least one of a) a first condition that the vehicle is in a stopped state, b) a second condition that a running speed of the vehicle is not higher than a reference speed, and c) a third condition that the ignition switch 322 has been switched between the ON state and the OFF state is met, or when at least one of the first to third conditions a), b), and c) is met and simultaneously at least one of d) a fourth condition that a solenoid-operated control valve as an object valve (i.e., the M/C shut-off valve 29, 30 or the simulator control valve 114) has been operated more than a predetermined number of times (e.g., each time the predetermined number is counted up by a counter and the counted-up number is reset to zero) and e) a fifth condition that the vehicle has run more than a predetermined distance (e.g., each time the predetermined distance is counted up by a counter and the counted-up distance is reset to zero) is met. In a failure detecting operation, the M/C shut-off valve 29 (or 30) as the object valve that is in the open state is switched to the closed state, and a failure of the valve 29 is detected based on a pressure change caused by the switching; and the simulator control valve 114 as the object valve that is in the closed state is switched to the open state, and a failure of the valve 114 is detected based on a pressure change caused by the switching.

The failure detection program represented by the flow chart shown in FIG. 6 is implemented at a predetermined cycle time. First, at Step S1, the brake ECU 300 judges whether the failure-detection starting condition has been met. If a positive judgment is made at Step S1, then the control of the ECU 300 goes to Step S2 to supply an electric current to the coil 170 of the M/C shut-off valve 29. If the shut-off valve 29 is normal, the valve 29 is switched to the closed state, that is, the movable member 184 is moved against the biasing force of the spring 166 and the valve member 164 is seated on the valve seat 162. Step S2 is followed by Step S3 to obtain hydraulic pressure values that are detected by the W/C pressure sensor 315 provided in the liquid passage 26, during a predetermined time duration. Step S3 is followed by Step S4 to judge whether a pulse-like change amount $\Delta P_k$ actually detected by the sensor 315 is larger than the failure detection threshold value $\Delta P_{thkwc}$. A positive judgment indicates that the movable member 184 has been actually moved, and accordingly the control goes to Step S5 to make a judgment that the M/C shut-off valve 29 is normal. On the other hand, a negative judgment indicates that the movable member 184 has not been actually moved, and accordingly the control goes to Step S6 to make a judgment that the M/C shut-off valve 29 has failed.

Step S5 or Step S6 is followed by Step S7 to supply an electric current to the coil 210 of the simulator control valve 114. If the simulator control valve 114 is normal, the valve 114 is switched to the open state, that is, the movable member 234 is moved against the biasing force of the spring 216 and the valve member 214 is moved away from the valve seat 212. Owing to the movement of the movable member 234, the volume of the valve chamber 222 increases. Step S7 is followed by Step S8 to obtain hydraulic pressure values that are detected by the M/C pressure sensor 313 provided in the liquid passage 26, during a predetermined time duration. Step S8 is followed by Step S9 to judge whether a pulse-like change amount $\Delta P_{kmc}$ actually detected by the sensor 313 is greater than the failure detection threshold value $\Delta P_{thkmc}$. A positive judgment indicates that the movable member 234 has been actually moved, and accordingly the control goes to Step S10 to make a judgment that the simulator control valve 114 is normal. On the other hand, a negative judgment indicates that the movable member 184 has not been actually moved in spite of the supplying of electric current to the coil 220, and accordingly the control goes to Step S11 to make a judgment that the simulator control valve 114 has failed.

Thus, in the present embodiment, a failure of each of the M/C shut-off valves 29, 30 and the simulator control valve 114 can be detected based on a change of the hydraulic pressure resulting from a change of the volume of a corresponding one of the valve chambers 160, 210 caused by a movement of a corresponding one of the movable members 184, 234. More specifically described, if an actual pulse-like change of the hydraulic pressure is greater than a failure-detection threshold value, it is judged that the each valve 29, 30, 114 is normal; and if not, it is judged that the each valve 29, 30, 114 has failed.

In addition, a failure of the simulator control valve 114 can be detected in the state in which the M/C shut-off valve 29 is closed. Therefore, the change of the hydraulic pressure resulting from the change of the volume of the valve chamber 210 caused by the movement of the movable member 234 can be more reliably detected.

In addition, in the present embodiment, a failure of each of the M/C shut-off valves 29, 30 can be detected by utilizing the change of the hydraulic pressure resulting from the change of the volume of a corresponding one of the valve chambers 160 caused by the movement of a corresponding one of the movable members 184. That is, a failure of each of the M/C shut-off valves 29, 30 can be easily detected by supplying an electric current to the coil 170 of the each valve 29, 30, and a time needed to detect the failure can be shortened. In a state in which there is a large difference of the respective hydraulic pressures on the opposite sides of each of the M/C shut-off valves 29, 30 each of which is the normally open valve, a failure of the each valve 29, 30 can be detected by utilizing a flow of the working liquid. For example, in a state in which the working liquid in the M/C 12 is pressurized, each one of the M/C shut-off valves 29, 30 is closed and a corresponding one of the pressure-decrease linear valves 90, 91 is opened, so as to decrease the hydraulic pressure in a corresponding one of the brake cylinders 20, 21 to an atmospheric pressure, and subsequently the one pressure-decrease linear valve 90, 91 is closed and the each M/C shut-off valve 29, 30 is opened; or alternatively, in a state in which the working liquid in the M/C 12 is not pressurized, each one of the M/C shut-off valves 29, 30 is closed and the pump device 14 is operated to increase the hydraulic pressure in a corresponding one of the brake cylinders 20, 21, and subsequently the each M/C shut-off valve 29, 30 is opened.

As is apparent from the foregoing description of the preferred embodiment of the present invention, portions of the brake ECU 300 that store and implement the failure detection program represented by the flow chart of FIG. 6 constitute a failure detecting portion or a peak-pressure-dependent failure detecting portion. In addition, portions of the brake ECU 300 that store and implement Steps S2 through S6 constitute a M/C-shut-off-valve failure detecting portion; and portions of the brake ECU 300 that store and implement Steps S7 through S11 constitute a simulator-control-valve failure detecting portion. Moreover, portions of the brake ECU 300 that store and implement Steps S2 and S7 constitute a valve control portion or an electric-current control portion.

In the illustrated embodiment, a failure of the simulator control valve 114 is detected in the state in which the M/C shut-off valve 29 is closed after a failure of the M/C shut-off valve 29 is detected. However, the present failure detecting apparatus may be modified such that a failure of the simulator control valve 114 and a failure of the M/C shut-off valve 29 are detected independent of each other.

Figure 7:
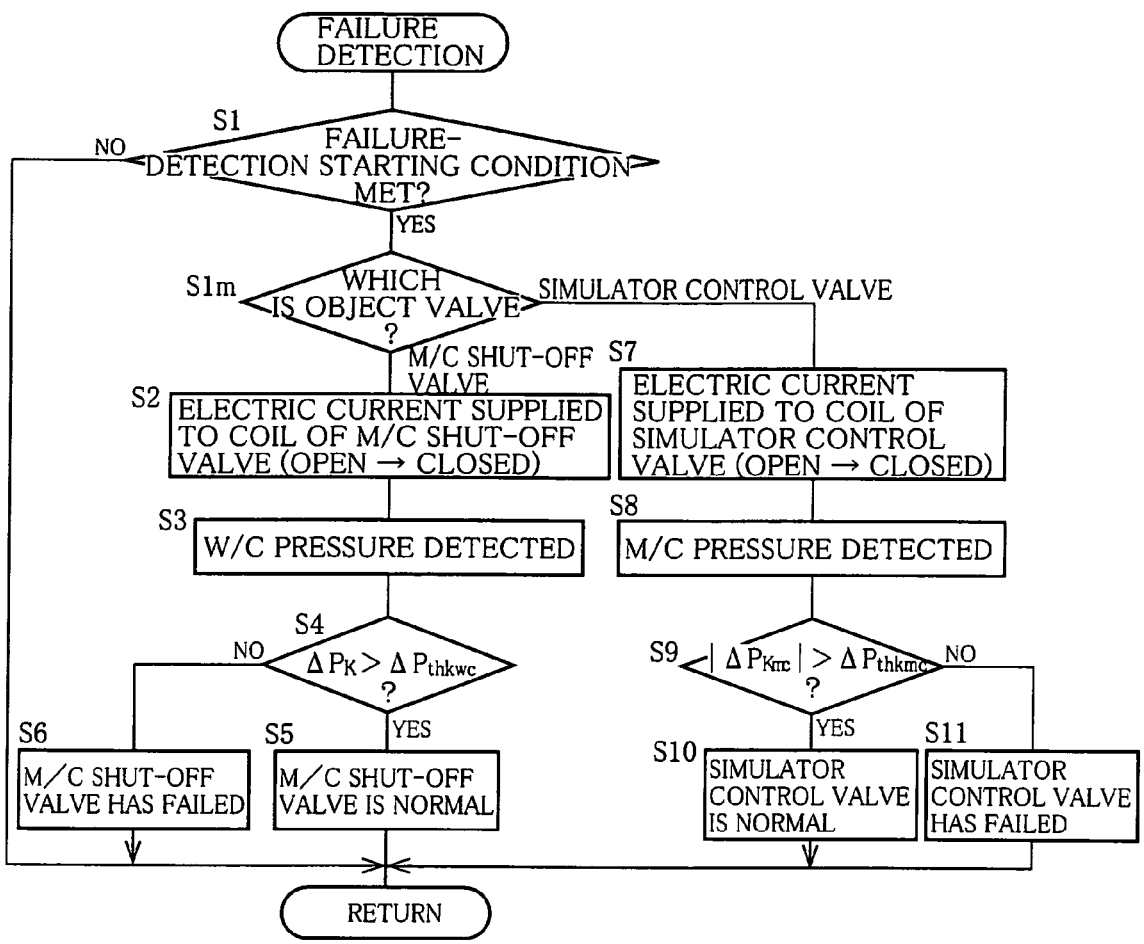
FIG. 7 is a flow chart representing another failure detection program stored by the storing portion of the failure detecting apparatus.

For example, a failure of the simulator control valve 114 and a failure of the M/C shut-off valve 29 may be alternately detected each time a failure-detection starting condition is met. This failure detecting operation is carried out according to a failure detection program represented by a flow chart of FIG. 7.

In this second embodiment of the present invention, if a failure-detection starting condition is met, i.e., if a positive judgment is made at Step S1, then the control of the brake ECU 300 goes to Step S1$m$ to judge which is an object valve whose failure is to be detected, the M/C shut-off valve 29 or the simulator control valve 114. If the object valve is the M/C shut-off valve 29, the control goes to Step S2 and the following steps to detect a failure of the M/C shut-off valve 29 in the same manner as that employed by the above-described first embodiment; and if the object valve is the simulator control valve 114, the control goes to Step S7 and the following steps to detect a failure of the simulator control valve 114 in the same manner as that employed by the first embodiment.

In each of the above-described embodiments, a failure of each solenoid-operated control valve 29, 30, 114 is detected based on the pulse-like change amount $\Delta P_k$, $\Delta P_{kmc}$. However, the present failure detecting apparatus may be modified to detect a failure of a solenoid-operated control valve based on the average-pressure change amount $\Delta P_s$. In addition, the failure-detecting starting condition may be a condition that the stroke sensor (i.e., brake switch) 310 has been switched from an OFF state thereof to an ON state thereof This failure detecting operation is carried out according to a failure detection program represented by a flow chart of FIG. 8.

At Step S1$a$, the brake ECU 300 judges whether the brake switch 310 has been switched from the OFF state thereof to the ON state thereof If a positive judgment is made at Step S1$a$, then the control goes to Step S2$m$ to obtain hydraulic pressure values in the brake cylinder 20 during a predetermined time duration and calculate an average, $P_{wcb}$, of those obtained hydraulic pressure values. Step S2$m$ is followed by Step S2 where the brake ECU 300 supplies an electric current to the coil 170 of the M/C shut-off valve 29. Step S2 is followed by Step S3$a$ to obtain hydraulic pressure values in the brake cylinder 20 during a predetermined time duration after a pulse-like pressure change and calculate an average, $P_{wca}$, of those obtained hydraulic pressure values. Step S3$a$ is followed by Step S4$a$ to judge whether an amount of change of the average hydraulic pressure, $\Delta P_s(=P_{wcb}-P_{wca})$, as a difference of the two averages $P_{wcb}$, $P_{wca}$ is greater than a failure-detection threshold value, $\Delta P_{ths}$. If a positive judgment is made at Step S4$a$, the control goes to Step S5 to judge that the M/C shut-off valve 29 is normal; and if a negative judgment is made at Step S4$a$, the control goes to Step S6 to judge that the M/C shut-off valve 29 has failed.

A failure of the simulator control valve 114 can be detected in the same manner as described above.

Figure 8:
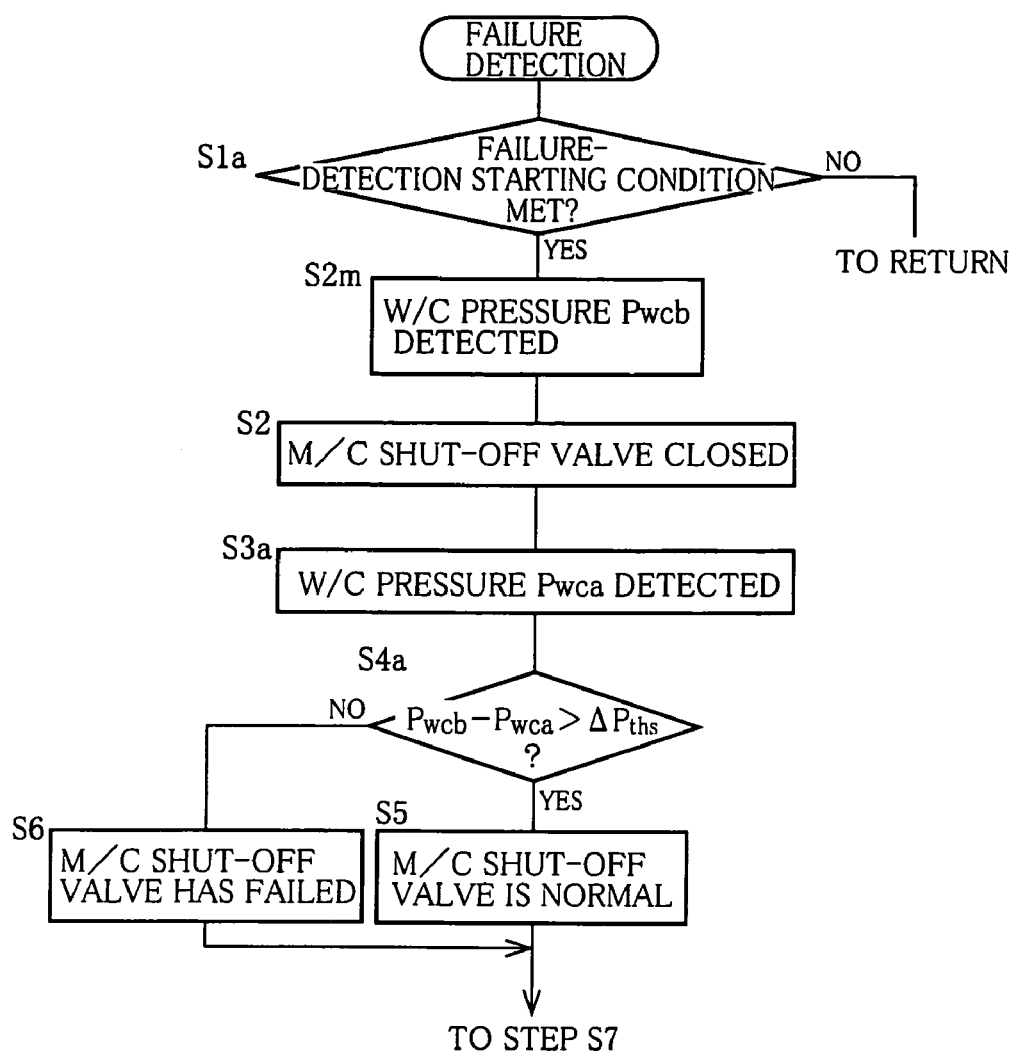
FIG. 8 is a flow chart representing a portion of another failure detection program stored by the storing portion of the failure detecting apparatus.

In the third embodiment shown in FIG. 8, the detection of failure of the solenoid-operated control valve 29, 30, 114 is trigged by an event that the brake switch 310 is switched from the OFF state to the ON state. Immediately after the brake switch 310 is switched from the OFF state to the ON state, the working liquid in the M/C 12 has not been pressurized. Thus, in the present embodiment, the failure detecting operation is carried out under the condition that the working liquid in the M/C 12 has not been pressurized and a difference of the respective hydraulic pressures on the opposite sides of the solenoid-operated control valve 29, 30, 114 is negligible.

In addition, each time the brake pedal 10 is operated or depressed by the driver, the failure detecting operation is carried out. However, as described above, under the condition that the braking system is normal, the M/C shut-off valves 29, 30 are closed and the simulator control valve 114 are open, when the braking system starts a braking operation. Thus, the M/C shut-off valves 29, 30 and the simulator control valve 114 are operated when the failure detecting operation is carried out, in the same manner as the manner in which they are operated when the braking system starts the braking operation. That is, since the M/C shut-off valves 29, 30 and the simulator control valve 114 need not be additionally operated when the failure detecting operation is carried out, an amount of consumption of electric energy can be reduced as such.

In the third embodiment shown in FIG. 8, the average-pressure change amount $\Delta P_s$ is obtained as the difference of (a) the average hydraulic pressure $P_{wcb}$ in the brake cylinder 20 before the supplying of electric current to the coil 170 and (b) the average hydraulic pressure $P_{wca}$ in the brake cylinder 20 after the pulse-like pressure change caused by the supplying of electric current to the coil 170. However, it is possible to obtain an average-pressure change amount $\Delta P_s$ as a difference of (a') an average hydraulic pressure $P_{wcb}$ in the brake cylinder 20 after the supplying of electric current to the coil 170 and before the pulse-like pressure change and (b) the average hydraulic pressure $P_{wca}$ in the brake cylinder 20 after the pulse-like change.

In addition, in the third embodiment, the same failure-detection starting condition as that employed at Step S1 in the first or second embodiment may be employed in place of the failure-detection starting condition employed at Step S1$a$. For example, at Step S1$a$, the failure detection operation may be triggered in an event that the ignition switch 322 has been switched between the ON state thereof and the OFF state thereof.

In the third embodiment, portions of the brake ECU 300 that store and implement Steps S2$m$ through S6 of the failure detection program represented by the follow chart of FIG. 8 constitute an average-pressure-dependent failure detecting portion.

Figure 9:
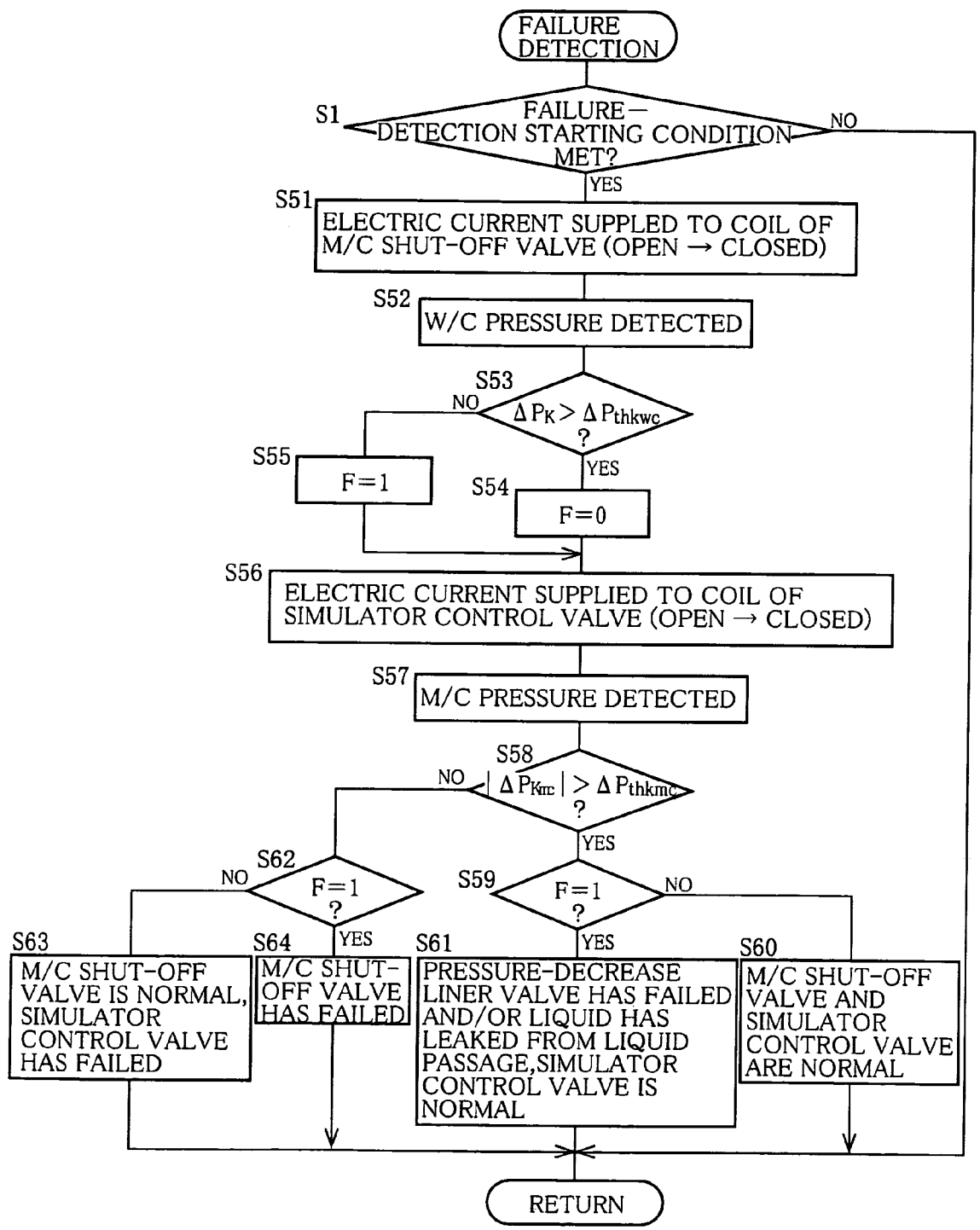
FIG. 9 is a flow chart representing another failure detection program stored by the storing portion of the failure detecting apparatus.

In a fourth embodiment of the present invention, a failure of each of the liquid passages 26, 27, such as a leakage of the working liquid from the each liquid passage 26, 27, can be detected in addition to a failure of each of the M/C shut-off valves 29, 30 and the simulator control valve 114. In the fourth embodiment, a failure detecting operation is carried out according to a failure detection program represented by a flow chart of FIG. 9.

If a failure-detection starting condition is met at Step S1, i.e., if a positive judgment is made at Step S1, then the control of the brake ECU 300 goes to Steps S51, S52, and S53 so as to supply an electric current to the coil 170 of the M/C shut-off valve 29, obtain hydraulic pressure values in the brake cylinder 20, and judge whether a pulse-like pressure change amount $\Delta P_k$ is greater than a failure-detection threshold value $\Delta P_{thkwc}$. If a positive judgment is made at Step S53, the control goes to Step S54 to set a failure-detection flag, F, to F=0 indicating that the M/C shut-off valve 29 is normal; and if a negative judgment is made at Step S53, the control goes to Step S55 to set the failure-detection flag F to F=1 indicating a possibility that at least one of (a) a failure of the M/C shut-off valve 29, (b) a leakage of the working liquid from the liquid passage 26, and (c) a failure of the pressure-decrease linear valve 90, i.e., a failure that the valve 90 cannot be switched from the open state thereof to the closed state, i.e., is fixed to the open state. The negative judgment made at Step S53 means that the W/C-pressure sensor 315 has not detected a pressure pulse, and accordingly it indicates a possibility that a closed space has not been created because of e.g., a leakage of the working liquid from the liquid passage 26 or an abnormal fixation of the pressure-decrease linear valve 90 to the open state thereof.

Subsequently, the brake ECU 300 implements Steps S56, S57, and S58 so as to supply an electric current to the coil 220 of the simulator control valve 114, obtain hydraulic pressure values in the brake cylinder 20, and judge whether an absolute value $|\Delta P_{kmc}|$ of a pulse-like pressure change amount $\Delta P_{kmc}$ is greater than a failure-detection threshold value $\Delta P_{thkmc}$. If a positive judgment is made at Step S58, the control goes to Step S59 to judge whether the failure-detection flag F is set at F=1. If a negative judgment is made at Step S59, the control goes to Step S60 to judge that the M/C shut-off valve 29 and the simulator control valve 114 are normal. On the other hand, if a positive judgment is made at Step S59, the control goes to Step S61 to judge that the simulator control valve 114 is normal but some working liquid has been leaked from the liquid passage 26 and/or the pressure-decrease linear valve 90 is abnormally fixed to the open state thereof. In this case, it can be judged that the M/C shut-off valve 29 is normal, because the normalcy of the simulator control valve 114 indicates, with a high probability, that the M/C shut-off valve 29 has been closed. Thus, it can be said that at Step S55, a pressure pulse has not been detected by the W/C pressure sensor 315 because of a leakage of the working liquid from the liquid passage 26 or an abnormal fixation of the pressure-decrease linear valve 90 to the open state thereof.

On the other hand, if it is judged that the simulator control valve 114 has failed, i.e., if a negative judgment is made at Step S58, the control goes to Step S62 to judge whether the failure-detection flag F is set at F=1.

If a negative judgment is made at Step S62, the control goes to Step S63 to judge that the M/C shut-off valve 29 is normal but the simulator control valve 114 has failed. On the other hand, if a positive judgment is made at Step S62, the control goes to Step S64 to judge that the M/C shut-off valve 29 has failed, because it can be said that at Step S58, a pressure pulse has not been detected because the M/C shut-off valve 29 has been kept to the open state thereof.

Thus, in the fourth embodiment, the failure detecting apparatus can detect not only a failure of each of the M/C shut-off valves 29, 30 and the simulator control valve 114 but also a leakage of the working liquid from each of the liquid passages 26, 27 and an abnormal fixation of each of the pressure-decrease linear valves 90, 91 to the open state thereof.

In the fourth embodiment, a failure of each of the M/C shut-off valves 29, 30 can be detected based on not the pulse-like pressure change amount $\Delta P_k$ but the average pressure change amount $\Delta P_s$ that is obtained at Step S4$a$ in the third embodiment.

In each of the first through fourth embodiments, a failure of the M/C shut-off valve 30 can be detected in the same manner as the manner in which the failure of the M/C shut-off valve 29 is detected.

In addition, in each of the first through fourth embodiments, a failure of the M/C shut-off valve 29 is detected based on the pressure change caused by the switching of the valve 29 from the open state thereof to the closed state thereof, and a failure of the simulator control valve 114 is detected based on the pressure change caused by the switching of the valve 114 from the closed state thereof to the open state thereof. However, a failure of the M/C shut-off valve 29 may be detected based on a pressure change caused by the switching of the valve 29 from the closed state thereof to the open state thereof and a failure of the simulator control valve 114 may be detected based on a pressure change caused by the switching of the valve 114 from the open state thereof to the closed state thereof.

The present failure detecting apparatus can be so modified as to detect a failure of each of the solenoid-operated control valves 29, 30 based on both the pulse-like pressure change amount $\Delta P_k$ and the average pressure change amount $\Delta P_s$. For example, when the each valve 29, 30 is judged as being normal based on the pulse-like pressure change amount $\Delta P_k$ and simultaneously when the each valve 29, 30 is judged as being normal based on the average pressure change amount $\Delta P_s$, the each valve 29, 30 may be finally judged as being normal; and when the each valve 29, 30 is judged as having failed based on at least one of the pulse-like pressure change amount $\Delta P_k$ and the average pressure change amount $\Delta P_s$, the each valve 29, 30 may be finally judged as having failed.

In each of the first through fourth embodiments, each of the M/C shut-off valves 29, 30 and the simulator control valve 114 each of which is constituted by the solenoid-operated open-and-close valve is used as the object valve whose failure is to be detected. However, each of the pressure-increase linear valves 80 through 83 and the pressure-decrease linear valves 90 through 93 each of which is constituted by a linear valve may be used as an object valve whose failure is to be detected. In this case, each of the pressure-increase linear valves 80 through 83 and the pressure-decrease linear valves 90, 91 each of which is a normally closed valve may be switched from the closed state to the open state by supplying a maximum electric current thereto, and the pressure-decrease linear valves 92, 93 each of which is a normally open valve may be switched from the open state to the closed state by supplying a maximum electric current thereto, so that a failure of each of the linear valves 80 through 83, 90 through 93 may be detected in the same manner as described above, i.e., based on a change of the hydraulic pressure caused by the switching of the each linear valve.

However, the failure of each linear valve 80 through 83, 90 through 93 may be detected by supplying not the maximum electric current but a prescribed electric current smaller than the maximum electric current. Since a linear valve is constructed such that a stroke of movement of a movable member thereof corresponds to a magnitude of an electric current supplied thereto, an amount of change of a volume of a valve chamber thereof that corresponds to the electric current supplied thereof can be obtained or measured. Therefore, a failure of the linear valve can be detected using a change of a hydraulic pressure that corresponds to the amount of change of the volume of the valve chamber.

In each of the illustrated embodiments, each of the failure-detection threshold values is determined based on the change of the hydraulic pressure that is experimentally measured by controlling (e.g., changing, or initially supplying) the electric current supplied to the coil of a corresponding one of the solenoid-operated control valves 29, 30, 114, 80-83, 90-93 each of which is in a normal state. However, each of the failure-detection threshold values may be determined based on a theoretical value of the change of the hydraulic pressure that corresponds to, e.g., the construction of a corresponding one of the solenoid-operated control valves 29, 30, 114, 80-83, 90-93. For example, each of the failure-detection threshold values may be determined as follows: A value, Y, defined by the following expression is greater than a failure-detection threshold value:

$$Y=k\cdot(S/Q)+A$$

where S is a flow area of a corresponding one of the solenoid-operated control valves 29, 30, 114, 80-83, 90-93; Q is an amount of change of the volume of the valve chamber of the one control valve; k is a negative coefficient; and A is a positive constant.

In each of the illustrated embodiments, each of the M/C shut-off valves 29, 30 is constructed such that the communication passage 190 connecting between the valve chamber 160 and the plunger chamber 172 is defined by the gap or clearance provided between the inner circumferential surface of the guide hole 180 and the outer circumferential surface of the shaft 182. However, this is not an essential feature.

Figure 12:
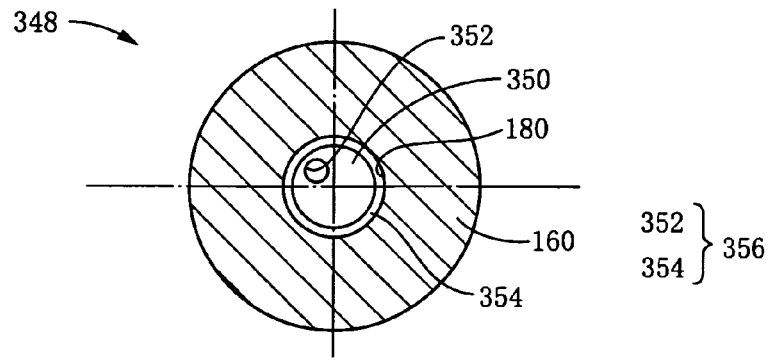
FIG. 12 is a cross-section view corresponding to FIG. 3, showing another M/C shut-off valve as the object valve.

FIG. 12 shows another M/C shut-off valve 348 that may be used in place of each of the M/C shut-off valves 29, 30 in the first embodiment shown in FIG. 1. In this modified embodiment, a shaft 352, provided in the guide hole 180, has a through-hole 352 that cooperates with a gap 354, provided outside the shaft 352, to constitute a communication passage 356. Thus, a flow area (i.e., a transverse cross-section area) of the communication passage 356 can be freely adjusted by changing an inner diameter of the through-hole 352. In addition, the flow area of the communication passage 356 can be increased without increasing the transverse cross-section area of the guide hole 180. Thus, the pulsation of the hydraulic pressure upon switching of the M/C shut-off valve 348 between the open and closed states thereof can be reduced, while the noise produced by the operation of the valve 348 can also be reduced.

Figure 13:
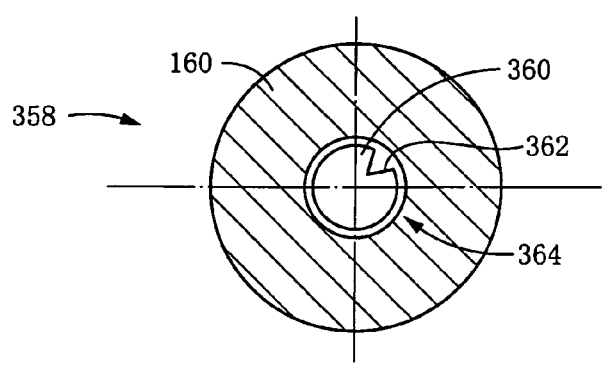
FIG. 13 is a cross-section view corresponding to FIG. 3, showing another M/C shut-off valve as the object valve.

FIG. 13 shows another M/C shut-off valve 358 that may be used in place of each of the M/C shut-off valves 29, 30 in the first embodiment shown in FIG. 1. In this modified embodiment, a shaft 360 has an axial recess 362 that is formed in an outer circumferential surface thereof so as to extend in an axial direction thereof. A gap provided between the outer circumferential surface of the shaft 360 and the inner circumferential surface of the guide hole 180 defines a communication passage 364. Thus, a flow area of the communication passage 364 can be adjusted by adjusting a transverse cross-section area of the axial recess 362.

Figure 14:
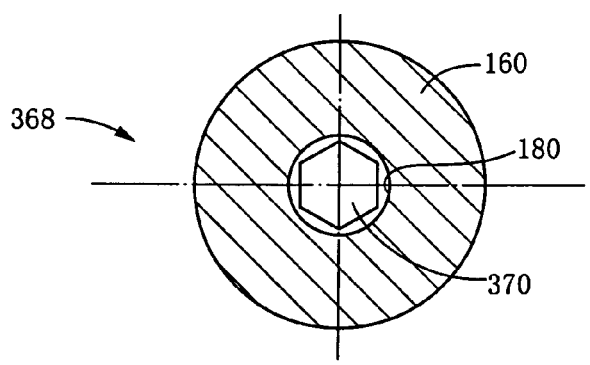
FIG. 14 is a cross-section view corresponding to FIG. 3, showing another M/C shut-off valve as the object valve.

FIG. 14 shows another M/C shut-off valve 368 that may be used in place of each of the M/C shut-off valves 29, 30 in the first embodiment shown in FIG. 1. In this modified embodiment, a shaft 370 has a hexagonal transverse cross-section shape. Thus, a communication passage 372 defined by a gap provided between an outer circumferential surface of the shaft 370 and the inner circumferential surface of the guide hole 180 can have a larger flow area than a flow area in the case where the shaft 370 has a circular transverse cross-section shape. However, the shaft 370 may have a different polygonal transverse cross-section shape, such as a triangular or quadrangular shape.

Figure 15:
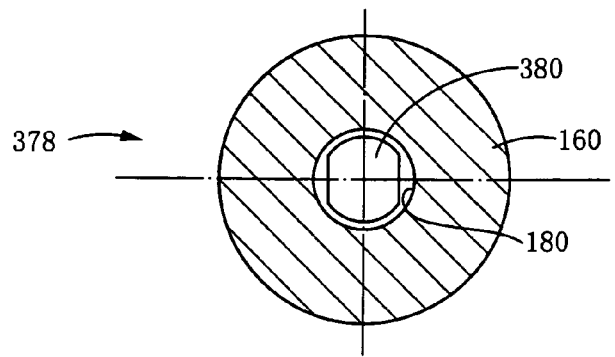
FIG. 15 is a cross-section view corresponding to FIG. 3, showing another M/C shut-off valve as the object valve.

FIG. 15 shows another M/C shut-off valve 378 that may be used in place of each of the M/C shut-off valves 29, 30 in the first embodiment shown in FIG. 1. In this modified embodiment, a shaft 380 has a transverse cross-section shape having a pair of chambered portions that are diametrically opposite to each other.

The simulator control valve 114 may be modified in the same manner as the manner in which each of the M/C shut-off valves 29, 30 is modified in the respective embodiments shown in FIGS. 13, 14, and 15.

The principle of the present invention may be applied to not only a hydraulic brake device but also an air brake device, and may be applied to a suspension system employing one or more solenoid-operated control valves.

while the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

What is claimed is:

1. A failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil, so that the solenoid-operated control valve is selectively placed in one of an open state thereof and a closed state thereof, the failure detecting apparatus comprising:

a pressure-change detecting device which detects a change of a pressure on at least one of a high-pressure side and a low-pressure side of the solenoid-operated control valve;

a condition-dependent valve control portion which controls, under a condition that the solenoid-operated control valve is in the open state thereof and a difference of a high pressure on the high-pressure side of the solenoid-operated control valve and a low pressure on the low-pressure side of the solenoid-operated control valve that is lower than the high pressure is negligible, the electric current supplied to the coil of the solenoid-operated control valve so as to attempt to switch the solenoid-operated control valve from the open state thereof to the closed state thereof; and a failure detecting portion which detects that the solenoid-operated control valve has failed, when a change of the pressure detected by the pressure-change detecting device upon controlling of the electric current supplied to the coil is smaller than a change of the pressure that results from a change of the volume of the valve chamber caused by a movement of the movable member to switch the solenoid-operated control valve from the open state thereof to the closed state thereof.

2. The failure detecting apparatus according to claim 1, wherein the failure detecting portion comprises a peak-pressure-dependent failure detecting portion which detects that the solenoid-operated control valve has failed, when an absolute value of a difference of a base pressure and a peak pressure of a pressure pulse as the change of the pressure detected by the pressure-change detecting device is smaller than an absolute value of a difference of a base pressure and a peak pressure of a pressure pulse as the change of the pressure that results from the change of the volume of the valve chamber caused by the movement of the movable member.

3. The failure detecting apparatus according to claim 1, wherein the solenoid-operated control valve comprises:
   a main body which has the valve chamber, a plunger chamber formed at a position remote from the valve chamber, and a guide hole formed between the valve chamber and the plunger chamber;
   a seating valve including a valve seat which is provided in the valve chamber, a valve member which is movable toward, and away from, the valve seat, and a spring which defines a position of the valve member relative to the valve seat in a state in which the electromagnetic drive force is not produced;
   a solenoid including the coil and a plunger which is provided in the plunger chamber and which produces the electromagnetic drive force; and
   an electromagnetic-drive-force transmitting member which is provided in the guide hole and transmits the electromagnetic drive force to the valve member, and which cooperates with the valve member to constitute the movable member.

4. The failure detecting apparatus according to claim 3, wherein the main body of the solenoid-operated control valve further has a communication passage through which the valve chamber and the plunger chamber communicate with each other and which has a flow area through which a working fluid flows, and wherein a ratio of the flow area to an amount of the change of the volume of the valve chamber caused by the movement of the movable member is smaller than a ratio-related reference value.

5. The failure detecting apparatus according to claim 4, wherein the communication passage comprises a gap which is provided between an inner circumferential surface of the guide hole and an outer circumferential surface of the electromagnetic-drive-force transmitting member.

6. The failure detecting apparatus according to claim 4, wherein the communication passage comprises a through-hole which extends through the electromagnetic-drive-force transmitting member in an axial direction thereof.

7. The failure detecting apparatus according to claim 4, wherein the solenoid-operated control valve comprises a solenoid-operated open-and-close valve in which the movable member is moved over a predetermined stroke at each of a first time when the electric current is supplied to the coil and a second time when the electric current is cut off from the coil, and wherein the ratio of the flow area to the amount of the change of the volume of the valve chamber caused by the movement of the movable member over the predetermined stroke is smaller than the ratio-related reference value.

8. The failure detecting apparatus according to claim 4, wherein the solenoid-operated control valve comprises a linear control valve in which the movable member is moved over a stroke corresponding to at least a magnitude of the electric current supplied to the coil, and wherein the failure detecting portion detects whether the solenoid-operated control valve has failed, under a condition that the ratio of the flow area to the amount of the change of the volume of the valve chamber caused by the movement of the movable member over the stroke is smaller than the ratio-related reference value.

9. The failure detecting apparatus according to claim 1, wherein the solenoid-operated control valve comprises a master-cylinder shut-off valve as a solenoid-operated open-and-close valve which is normally open and which is provided between (a) a manual hydraulic-pressure source which produces a hydraulic pressure corresponding to an operating force manually applied by a driver to a brake operating member and (b) a brake cylinder of a hydraulic brake which applies, owing to the hydraulic pressure, a hydraulic braking force to a wheel, and wherein the failure detecting portion comprises a master-cylinder-shut-off-valve failure detecting portion which detects whether the master-cylinder shut-off valve has failed, based on the change of the pressure detected by the pressure-change detecting device upon supplying of the electric current to the coil of the master-cylinder shut-off valve.

10. The failure detecting apparatus according to claim 9, wherein the pressure-change detecting device comprises a brake-cylinder pressure sensor which is provided between the master-cylinder shut-off valve and the brake cylinder.

11. The failure detecting apparatus according to claim 1, wherein the solenoid-operated control valve comprises a simulator control valve as a solenoid-operated open-and-close valve which is normally closed and which is provided between (a) a manual hydraulic-pressure source which produces a hydraulic pressure corresponding to an operating force manually applied by a driver to a brake operating member and (b) a stroke simulator which receives and supplies, upon operation of the brake operating member, a working liquid from and to the manual hydraulic-pressure source and thereby applies, to the brake operating member, a reaction force corresponding to the operating force, and wherein the failure detecting portion comprises a simulator-control-valve failure detecting portion which detects whether the simulator control valve has failed, based on the change of the pressure detected by the pressure-change detecting device upon supplying of the electric current to the coil of the simulator control valve.

12. The failure detecting apparatus according to claim 11, wherein the pressure-change detecting device comprises a master-cylinder pressure sensor which is provided on one side of the simulator control valve where the manual hydraulic-pressure source is provided.

13. The failure detecting apparatus according to claim 1, wherein the condition-dependent valve control portion comprises an electric-current control portion which controls the electric current supplied to the coil of the solenoid-operated control valve, when a predetermined failure-detection starting condition is met.

14. The failure detecting apparatus according to claim 13, wherein the predetermined failure-detection starting condition comprises at least one of a) a first condition that a vehicle is in a stopped state, b) a second condition that a running speed of a vehicle is not higher than a reference speed, and c) a third condition that an ignition switch has been switched between an ON state and an OFF state.

15. The failure detecting apparatus according to claim 14, wherein the predetermined failure-detection starting condition further comprises at least one of d) a fourth condition that the solenoid-operated control valve has been operated more than a predetermined number of times and e) a fifth condition that a vehicle has run more than a predetermined distance.

16. The failure detecting apparatus according to claim 13, wherein the predetermined failure-detection starting condition comprises a condition that a driver's operation of a brake operating member has been detected.

17. A failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil, so that the solenoid-operated control valve is selectively placed in one of an open state thereof and a closed state thereof, the failure detecting apparatus comprising:

a pressure-change detecting device which detects a change of a pressure on at least one of a high-pressure side and a low-pressure side of the solenoid-operated control valve; and a failure detecting portion which detects that the solenoid-operated control valve has failed, when a change of the pressure detected by the pressure-change detecting device upon controlling of the electric current supplied to the coil is smaller than a change of the pressure that results from a change of the volume of the valve chamber caused by a movement of the movable member, wherein the solenoid-operated control valve comprises:

a main body which has the valve chamber, a plunger chamber formed at a position remote from the valve chamber, and a guide hole formed between the valve chamber and the plunger chamber;

a seating valve including a valve seat which is provided in the valve chamber, a valve member which is movable toward, and away from, the valve seat, and a spring which defines a position of the valve member relative to the valve seat in a state in which the electromagnetic drive force is not produced;

a solenoid including the coil and a plunger which is provided in the plunger chamber and which produces the electromagnetic drive force; and an electromagnetic-drive-force transmitting member which is provided in the guide hole and transmits the electromagnetic drive force to the valve member, and which cooperates with the valve member to constitute the movable member, wherein the main body of the solenoid-operated control valve further has a communication passage through which the valve chamber and the plunger chamber communicate with each other and which has a flow area through which a working fluid flows, and wherein a ratio of the flow area to an amount of the change of the volume of the valve chamber caused by the movement of the movable member is smaller than a ratio-related reference value, and wherein the ratio of the flow area to the amount of the change of the volume of the valve chamber is smaller than a pulsation-production-related reference value as the ratio-related reference value, and is greater than an operation-noise-reduction-related reference value smaller than the pulsation-production-related reference value.

18. A failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil, so that the solenoid-operated control valve is selectively placed in one of an open state thereof and a closed state thereof, the failure detecting apparatus comprising:

a pressure-change detecting device which detects a change of a pressure on at least one of a high-pressure side and a low-pressure side of the solenoid-operated control valve; and a failure detecting portion which detects that the solenoid-operated control valve has failed, when a change of the pressure detected by the pressure-change detecting device upon controlling of the electric current supplied to the coil is smaller than a change of the pressure that results from a change of the volume of the valve chamber caused by a movement of the movable member, wherein the solenoid-operated control valve comprises:

a main body which has the valve chamber, a plunger chamber formed at a position remote from the valve chamber, and a guide hole formed between the valve chamber and the plunger chamber;

a seating valve including a valve seat which is provided in the valve chamber, a valve member which is movable toward, and away from, the valve seat, and a spring which defines a position of the valve member relative to the valve seat in a state in which the electromagnetic drive force is not produced;

a solenoid including the coil and a plunger which is provided in the plunger chamber and which produces the electromagnetic drive force; and an electromagnetic-drive-force transmitting member which is provided in the guide hole and transmits the electromagnetic drive force to the valve member, and which cooperates with the valve member to constitute the movable member, wherein the main body of the solenoid-operated control valve further has a communication passage through which the valve chamber and the plunger chamber communicate with each other and which has a flow area through which a working fluid flows, and wherein a ratio of the flow area to an amount of the change of the volume of the valve chamber caused by the movement of the movable member is smaller than a ratio-related reference value, and wherein a value, Y, defined by a following expression is greater than an expression-related reference value:

$$Y = k \cdot (S/Q) + A$$

where S is the flow area; Q is the amount of the change of the volume of the valve chamber; k is a negative coefficient; and A is a positive constant.

19. A failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil, so that the solenoid-operated control valve is selectively placed in one of an open state thereof and a closed state thereof, the failure detecting apparatus comprising:

a pressure-change detecting device which detects a change of a pressure on at least one of a high-pressure side and a low-pressure side of the solenoid-operated control valve; and a failure detecting portion which detects that the solenoid-operated control valve has failed, when a change of the pressure detected by the pressure-change detecting device upon controlling of the electric current supplied to the coil is smaller than a change of the pressure that results from a change of the volume of the valve chamber caused by a movement of the movable member, wherein the solenoid-operated control valve comprises a simulator control valve as a solenoid-operated openand-close valve which is normally closed and which is provided between (a) a manual hydraulic-pressure source which produces a hydraulic pressure corresponding to an operating force manually applied by a driver to a brake operating member and (b) a stroke simulator which receives and supplies, upon operation of the brake operating member, a working liquid from and to the manual hydraulic-pressure source and thereby applies, to the brake operating member, a reaction force corresponding to the operating force, and wherein the failure detecting portion comprises a simulator-control-valve failure detecting portion which detects whether the simulator control valve has failed, based on the change of the pressure detected by the pressure-change detecting device upon supplying of the electric current to the coil of the simulator control valve, and wherein the failure detecting portion comprises a brake-cylinder-shut-off-state failure detecting portion which detects whether the simulator control valve has failed, by supplying the electric current to the coil of the simulator control valve in a state in which a master-cylinder shut-off valve which is provided between (a) the manual hydraulic-pressure source and (c) a brake cylinder of a hydraulic brake is in a closed state thereof.

20. A failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil, so that the solenoid-operated control valve is selectively placed in one of an open state thereof and a closed state thereof, the failure detecting apparatus comprising:

a pressure-change detecting device which detects a change of a pressure on at least one of a high-pressure side and a low-pressure side of the solenoid-operated control valve; and a failure detecting portion which detects that the solenoid-operated control valve has failed, when a change of the pressure detected by the pressure-change detecting device upon controlling of the electric current supplied to the coil is smaller than a change of the pressure that results from a change of the volume of the valve chamber caused by a movement of the movable member, wherein the failure detecting portion comprises an average-pressure-dependent failure detecting portion which detects that the solenoid-operated control valve has failed, when the pressure-change detecting device does not detect that an average of the pressure after the electric current supplied to the coil is so controlled as to switch the solenoid-operated control valve from the open state thereof to the closed state thereof is lower than an average of the pressure before the controlling of the electric current supplied to the coil.

* * * * *